(12) United States Patent
Hosseini et al.

(10) Patent No.: US 11,595,982 B2
(45) Date of Patent: Feb. 28, 2023

(54) INTRA-DEVICE COLLISION HANDLING

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 16/871,507

(22) Filed: May 11, 2020

(65) Prior Publication Data

US 2020/0367277 A1 Nov. 19, 2020

Related U.S. Application Data

(60) Provisional application No. 62/847,269, filed on May 13, 2019.

(51) Int. Cl.
*H04W 72/12* (2009.01)
*H04W 72/04* (2023.01)
(Continued)

(52) U.S. Cl.
CPC ....... *H04W 72/1289* (2013.01); *H04L 1/0067* (2013.01); *H04L 5/0055* (2013.01);
(Continued)

(58) Field of Classification Search
CPC ... H04L 1/0067; H04L 5/0055; H04L 5/0048; H04L 5/0053; H04W 72/1289;
(Continued)

(56) References Cited

U.S. PATENT DOCUMENTS

| 2015/0223254 | A1* | 8/2015 | Guo | H04L 1/00 370/312 |
| 2015/0256307 | A1* | 9/2015 | Nagata | H04W 24/00 370/328 |
| 2019/0246366 | A1* | 8/2019 | Sadeghi | H04W 76/27 |

FOREIGN PATENT DOCUMENTS

WO   WO-2018128369 A1   7/2018

OTHER PUBLICATIONS

CATT: "Discussion on Intra-UE Multiplexing Scenarios", 3GPP Draft, 3GPP TSG RAN WG1 Ad-Hoc Meeting 1901, R1-1900337, Discussion on Intra-UE Multiplexing Scenarios, F-06921,Jan. 20, 2019 (Jan. 20, 2019), XP051593251, 9 pages (Year: 2019).*

(Continued)

*Primary Examiner* — Lan-Huong Truong
(74) *Attorney, Agent, or Firm* — Holland & Hart LLP/Qualcomm Incorporated

(57) ABSTRACT

Methods, systems, and devices for wireless communications are described to enable a user equipment (UE) to determine a rate-matching scheme or a feedback scheme for overlapping downlink transmission resources. A collision handling scheme may enable the UE to de-rate match a second, higher priority downlink shared channel independent of another rate-matching pattern or indicator for other shared channels, such as a first, overlapping downlink shared channel. The UE may determine to de-rate match the second channel around resources indicated within control signaling or higher-layer signaling associated with the second channel. The collision scheme may provide for the UE to generate an acknowledgement bit for feedback for one or more portions of the first channel that are preempted by the second channel and generate other feedback for non-preempted portions. A base station may keep track of preempted resources and may retransmit preempted portions of the first channel.

30 Claims, 18 Drawing Sheets

(51) Int. Cl.
  *H04L 5/00* (2006.01)
  *H04W 74/08* (2009.01)
  *H04W 76/27* (2018.01)
  *H04L 1/00* (2006.01)
(52) U.S. Cl.
  CPC ..... *H04W 72/042* (2013.01); *H04W 72/1247* (2013.01); *H04W 74/0816* (2013.01); *H04W 76/27* (2018.02)
(58) Field of Classification Search
  CPC .......... H04W 72/042; H04W 72/1247; H04W 74/0816; H04W 76/27; H04W 72/1273; H04W 72/0446; H04W 72/048
  See application file for complete search history.

(56) References Cited

OTHER PUBLICATIONS

Mediatek Inc: "Clarification for sPDSCH Rate Matching Behavior with Two SPDCCH PRB Set", 3GPP Draft, 3GPP TSG RAN WG1 #92bis, R1-1805087, Apr. 15, 2018 (Apr. 15, 2018), XP051427347, 4 Pages (Year: 2018).*

International Search Report and Written Opinion—PCT/US2020/032495—ISA/EPO—dated Oct. 19, 2020.
CATT: "Discussion on Intra-UE Multiplexing Scenarios", 3GPP Draft, 3GPP TSG RAN WG1 Ad-Hoc Meeting 1901, R1-1900337, Discussion on Intra-UE Multiplexing Scenarios, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051593251, 9 pages, Retrieved from the Internet: URL: http://www.3gpp.org/ftp/Meetings%5F3GPP%5FSYNC/RAN1/Docs/R1%2D1900337%2Ezip [retrieved on Jan. 20, 2019] figures 1-4 sections 2-3.
Mediatek Inc: "Clarification for sPDSCH Rate Matching Behavior with Two SPDCCH PRB Set", 3GPP Draft, 3GPP TSG RAN WG1 #92bis, R1-1805087—Mediatek—Clarification for SPDSCH Rate Matching Behavior With Two SPDCCH PRB Set, 3rd Generation Partnership Project (3GPP), Mobile Competence Centre, 650, Route Des Lucioles, vol. RAN WG1, No. Sanya, China; Apr. 16, 2018-Apr. 20, 2018, Apr. 15, 2018 (Apr. 15, 2018), XP051427347, 4 Pages, Retrieved from the Internet: URL: http://www.3gpp.org/ftp/Meetings%5F3GPP%5FSYNC/RAN1/Docs/ [retrieved on Apr. 15, 2018], sections 2-3.
Partial International Search Report—PCT/US2020/032495—ISA/EPO—dated Aug. 26, 2020.

* cited by examiner

INTRA-DEVICE COLLISION HANDLING

CROSS REFERENCE

The present application for patent claims the benefit of U.S. Provisional Patent Application No. 62/847,269 by Hosseini et al., entitled "INTRA-DEVICE COLLISION HANDLING," filed May 13, 2019, assigned to the assignee hereof, and expressly incorporated by reference herein.

FIELD OF TECHNOLOGY

The following relates generally to wireless communications and more specifically to intra-device collision handling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station may assign downlink resources for multiple transmissions to a UE that overlap in time or in time and frequency. Some UEs may be capable of processing the overlapping transmissions, but other UEs may be incapable of processing these transmissions, which may result in unsuccessful receptions and inefficient use of network resources.

SUMMARY

The described techniques relate to improved methods, systems, devices, and apparatuses that support intra-device collision handling. Generally, the described techniques provide for determining a rate-matching scheme or a feedback scheme for overlapping downlink transmission resources. In some cases, a user equipment (UE) may use a collision handling scheme to determine rate-matching resources when two channels having different priority levels (e.g., a first physical downlink shared channel (PDSCH) and a second PDSCH with different priority levels) are scheduled to overlap in time. For example, if the second PDSCH is associated with a higher priority than the first PDSCH, the collision handling scheme may ensure that the UE de-rate-matches the second PDSCH independent of any other rate-matching pattern or indicator for other shared channels (e.g., the first PDSCH, other PDSCHs, other configured rate-matching resources). In some cases, the UE may determine to de-rate-match the second PDSCH around resources indicated by downlink control signaling associated with the second PDSCH (e.g., dynamic resources indicated in a corresponding scheduling grant for the second PDSCH). Additionally or alternatively (e.g., if rate-matching resources are not indicated in the control signaling), the UE may de-rate-match the second PDSCH in accordance with a rate-matching (or de-rate matching) pattern or rate-matching resources configured for higher reliability communications indicated, for example, via radio resource control (RRC) signaling.

The UE may also use a collision handling scheme to determine feedback procedures when multiple channels (e.g., the first PDSCH and the second PDSCH) overlap in time or in time and frequency. In some cases, the UE may generate an acknowledgement (ACK) bit for one or more preempted code blocks (CBs) (e.g., overlapping CBs that are not processed) of the first PDSCH and may process other CBs within a same code block group (CBG) or a transport block (TB) to produce feedback (e.g., generate an ACK bit if all other CBs pass decoding, or generate a negative acknowledgement (NAK) bit if one CB fails decoding or if the CB is not processed). Other CBs within the CBG or the TB may include CBs before the UE stops processing preempted CBs of the first PDSCH or CBs after the last preempted symbol of the first PDSCH. The UE may send a feedback message to the base station based on the ACK bit generated for the preempted CBs and the ACK/NAK feedback generated for the other CBs. The base station may keep track of preempted resources (e.g., preempted CBs of the first PDSCH), and may retransmit any CBs that are preempted (e.g., even if an ACK is received from the UE for a CBG that corresponds to the preempted CBs).

A method of wireless communications at a UE is described. The method may include identifying a first set of resources scheduled for downlink communications on a first downlink shared channel for the UE, identifying a second set of resources scheduled for downlink communications on a second downlink shared channel for the UE, where the second set of resources at least partially overlaps the first set of resources, identifying a set of rate-matching resources configured for the second downlink shared channel, and obtaining a downlink message on the second downlink shared channel by de-rate matching around the set of rate-matching resources independent of any rate-matching resources configured for the first downlink shared channel.

An apparatus for wireless communications at a UE is described. The apparatus may include a processor, memory coupled with the processor, and instructions stored in the memory. The instructions may be executable by the processor to cause the apparatus to identify a first set of resources scheduled for downlink communications on a first downlink shared channel for the UE, identify a second set of resources scheduled for downlink communications on a second downlink shared channel for the UE, where the second set of resources at least partially overlaps the first set of resources, identify a set of rate-matching resources configured for the second downlink shared channel, and obtain a downlink message on the second downlink shared channel by de-rate matching around the set of rate-matching resources independent of any rate-matching resources configured for the first downlink shared channel.

Another apparatus for wireless communications at a UE is described. The apparatus may include means for identifying a first set of resources scheduled for downlink communications on a first downlink shared channel for the UE, identifying a second set of resources scheduled for downlink communications on a second downlink shared channel for the UE, where the second set of resources at least partially overlaps the first set of resources, identifying a set of rate-matching resources configured for the second downlink shared channel, and obtaining a downlink message on the second downlink shared channel by de-rate matching around the set of rate-matching resources independent of any rate-matching resources configured for the first downlink shared channel.

A non-transitory computer-readable medium storing code for wireless communications at a UE is described. The code may include instructions executable by a processor to identify a first set of resources scheduled for downlink communications on a first downlink shared channel for the UE, identify a second set of resources scheduled for downlink communications on a second downlink shared channel for the UE, where the second set of resources at least partially overlaps the first set of resources, identify a set of rate-matching resources configured for the second downlink shared channel, and obtain a downlink message on the second downlink shared channel by de-rate matching around the set of rate-matching resources independent of any rate-matching resources configured for the first downlink shared channel.

Some examples of the method, apparatuses, and non-transitory computer-readable medium described herein may further include operations, features, means, or instructions for identifying a first priority associated with the first downlink shared channel and a second priority associated with the second downlink shared channel, where the second priority may be higher than the first priority.

In some examples of the method, apparatuses, and non-transitory computer-readable medium described herein, the rate-matching resources configured for the first downlink shared channel at least partially overlap the set of rate-matching resources configured for the second downlink shared channel.

Some examples of the method, apparatuses, and non-transitory computer-readable medium described herein may further include operations, features, means, or instructions for receiving a first downlink control channel that indicates the first set of resources, and receiving a second downlink control channel that indicates the second set of resources.

In some examples of the method, apparatuses, and non-transitory computer-readable medium described herein, the first downlink control channel includes first downlink control information (DCI) for the first downlink shared channel, the first DCI indicating the rate-matching resources configured for the first downlink shared channel.

In some examples of the method, apparatuses, and non-transitory computer-readable medium described herein, the second downlink control channel includes second DCI for the second downlink shared channel, the second DCI indicating the set of rate-matching resources configured for the second downlink shared channel.

Some examples of the method, apparatuses, and non-transitory computer-readable medium described herein may further include operations, features, means, or instructions for receiving an indication of the set of rate-matching resources configured for the second downlink shared channel as a set of shared channel rate-matching resources associated with the second priority, where the rate-matching resources configured for the first downlink shared channel may be associated with the first priority.

In some examples of the method, apparatuses, and non-transitory computer-readable medium described herein, an indication of the set of shared channel rate-matching resources may be received via RRC signaling.

In some examples of the method, apparatuses, and non-transitory computer-readable medium described herein, the second set of resources at least partially overlaps the first set of resources in time.

In some examples of the method, apparatuses, and non-transitory computer-readable medium described herein, the second set of resources at least partially overlaps the first set of resources in time and frequency.

A method of wireless communications at a UE is described. The method may include identifying a set of CBs of a downlink shared channel for the UE, the downlink shared channel associated with a first priority, identifying that a portion of the set of CBs is preempted by a transmission of a second priority higher than the first priority, assigning an ACK bit to each CB that is at least partially preempted by the transmission, determining either an ACK bit or a NAK bit for each of the set of CBs that are not at least partially preempted, determining one or more feedback messages based on the ACK bits or the NAK bits assigned to or determined for each of the set of CBs, and transmitting the one or more feedback messages to report feedback for the set of CBs.

An apparatus for wireless communications at a UE is described. The apparatus may include a processor, memory coupled with the processor, and instructions stored in the memory. The instructions may be executable by the processor to cause the apparatus to identify a set of CBs of a downlink shared channel for the UE, the downlink shared channel associated with a first priority, identify that a portion of the set of CBs is preempted by a transmission of a second priority higher than the first priority, assign an ACK bit to each CB that is at least partially preempted by the transmission, determine either an ACK bit or a NAK bit for each of the set of CBs that are not at least partially preempted, determine one or more feedback messages based on the ACK bits or the NAK bits assigned to or determined for each of the set of CBs, and transmit the one or more feedback messages to report feedback for the set of CBs.

Another apparatus for wireless communications at a UE is described. The apparatus may include means for identifying a set of CBs of a downlink shared channel for the UE, the downlink shared channel associated with a first priority, identifying that a portion of the set of CBs is preempted by a transmission of a second priority higher than the first priority, assigning an ACK bit to each CB that is at least partially preempted by the transmission, determining either an ACK bit or a NAK bit for each of the set of CBs that are not at least partially preempted, determining one or more feedback messages based on the ACK bits or the NAK bits assigned to or determined for each of the set of CBs, and transmitting the one or more feedback messages to report feedback for the set of CBs.

A non-transitory computer-readable medium storing code for wireless communications at a UE is described. The code may include instructions executable by a processor to identify a set of CBs of a downlink shared channel for the UE, the downlink shared channel associated with a first priority, identify that a portion of the set of CBs is preempted by a transmission of a second priority higher than the first priority, assign an ACK bit to each CB that is at least partially preempted by the transmission, determine either an ACK bit or a NAK bit for each of the set of CBs that are not at least partially preempted, determine one or more feedback messages based on the ACK bits or the NAK bits assigned to or determined for each of the set of CBs, and transmit the one or more feedback messages to report feedback for the set of CBs.

Some examples of the method, apparatuses, and non-transitory computer-readable medium described herein may further include operations, features, means, or instructions for identifying a first priority associated with the downlink shared channel and a second priority associated with the transmission, where the second priority may be higher than the first priority.

Some examples of the method, apparatuses, and non-transitory computer-readable medium described herein may further include operations, features, means, or instructions for refraining from assigning a NAK feedback bit to each CB that may be at least partially preempted by the transmission.

Some examples of the method, apparatuses, and non-transitory computer-readable medium described herein may further include operations, features, means, or instructions for transmitting respective feedback messages for each CBG associated with the set of CBs, where each CBG includes multiple CBs of the set of CBs.

Some examples of the method, apparatuses, and non-transitory computer-readable medium described herein may further include operations, features, means, or instructions for transmitting respective feedback messages for each TB associated with the set of CBs, where each TB includes multiple CBs of the set of CBs.

Some examples of the method, apparatuses, and non-transitory computer-readable medium described herein may further include operations, features, means, or instructions for performing a decoding process on each of the set of CBs that may be not at least partially preempted, and determining feedback for each of the set of CBs that may be not at least partially preempted based on the decoding process.

A method of wireless communications at a base station is described. The method may include identifying a set of CBs of a downlink shared channel for a UE, the downlink shared channel associated with a first priority, identifying that a portion of the set of CBs is at least partially preempted by a transmission of a second priority higher than the first priority, receiving one or more feedback messages from the UE reporting feedback for the set of CBs, where at least one of the one or more feedback messages corresponds to the portion of the set of CBs that is at least partially preempted by the transmission, and retransmitting the portion of the set of CBs that were at least partially preempted, regardless of whether the at least one of the one or more feedback messages indicates an ACK or a NAK.

An apparatus for wireless communications at a base station is described. The apparatus may include a processor, memory coupled with the processor, and instructions stored in the memory. The instructions may be executable by the processor to cause the apparatus to identify a set of CBs of a downlink shared channel for a UE, the downlink shared channel associated with a first priority, identify that a portion of the set of CBs is at least partially preempted by a transmission of a second priority higher than the first priority, receive one or more feedback messages from the UE reporting feedback for the set of CBs, where at least one of the one or more feedback messages corresponds to the portion of the set of CBs that is at least partially preempted by the transmission, and retransmit the portion of the set of CBs that were at least partially preempted, regardless of whether the at least one of the one or more feedback messages indicates an ACK or a NAK.

Another apparatus for wireless communications at a base station is described. The apparatus may include means for identifying a set of CBs of a downlink shared channel for a UE, the downlink shared channel associated with a first priority, identifying that a portion of the set of CBs is at least partially preempted by a transmission of a second priority higher than the first priority, receiving one or more feedback messages from the UE reporting feedback for the set of CBs, where at least one of the one or more feedback messages corresponds to the portion of the set of CBs that is at least partially preempted by the transmission, and retransmitting the portion of the set of CBs that were at least partially preempted, regardless of whether the at least one of the one or more feedback messages indicates an ACK or a NAK.

A non-transitory computer-readable medium storing code for wireless communications at a base station is described. The code may include instructions executable by a processor to identify a set of CBs of a downlink shared channel for a UE, the downlink shared channel associated with a first priority, identify that a portion of the set of CBs is at least partially preempted by a transmission of a second priority higher than the first priority, receive one or more feedback messages from the UE reporting feedback for the set of CBs, where at least one of the one or more feedback messages corresponds to the portion of the set of CBs that is at least partially preempted by the transmission, and retransmit the portion of the set of CBs that were at least partially preempted, regardless of whether the at least one of the one or more feedback messages indicates an ACK or a NAK.

In some examples of the method, apparatuses, and non-transitory computer-readable medium described herein, the receiving may include operations, features, means, or instructions for receiving respective feedback messages for each TB associated with the set of CBs, where each TB includes multiple CBs of the set of CBs.

In some examples of the method, apparatuses, and non-transitory computer-readable medium described herein, the receiving may include operations, features, means, or instructions for receiving respective feedback messages for each CBG associated with the set of CBs, where each CBG includes multiple CBs of the set of CBs.

DETAILED DESCRIPTION

Figure 1:
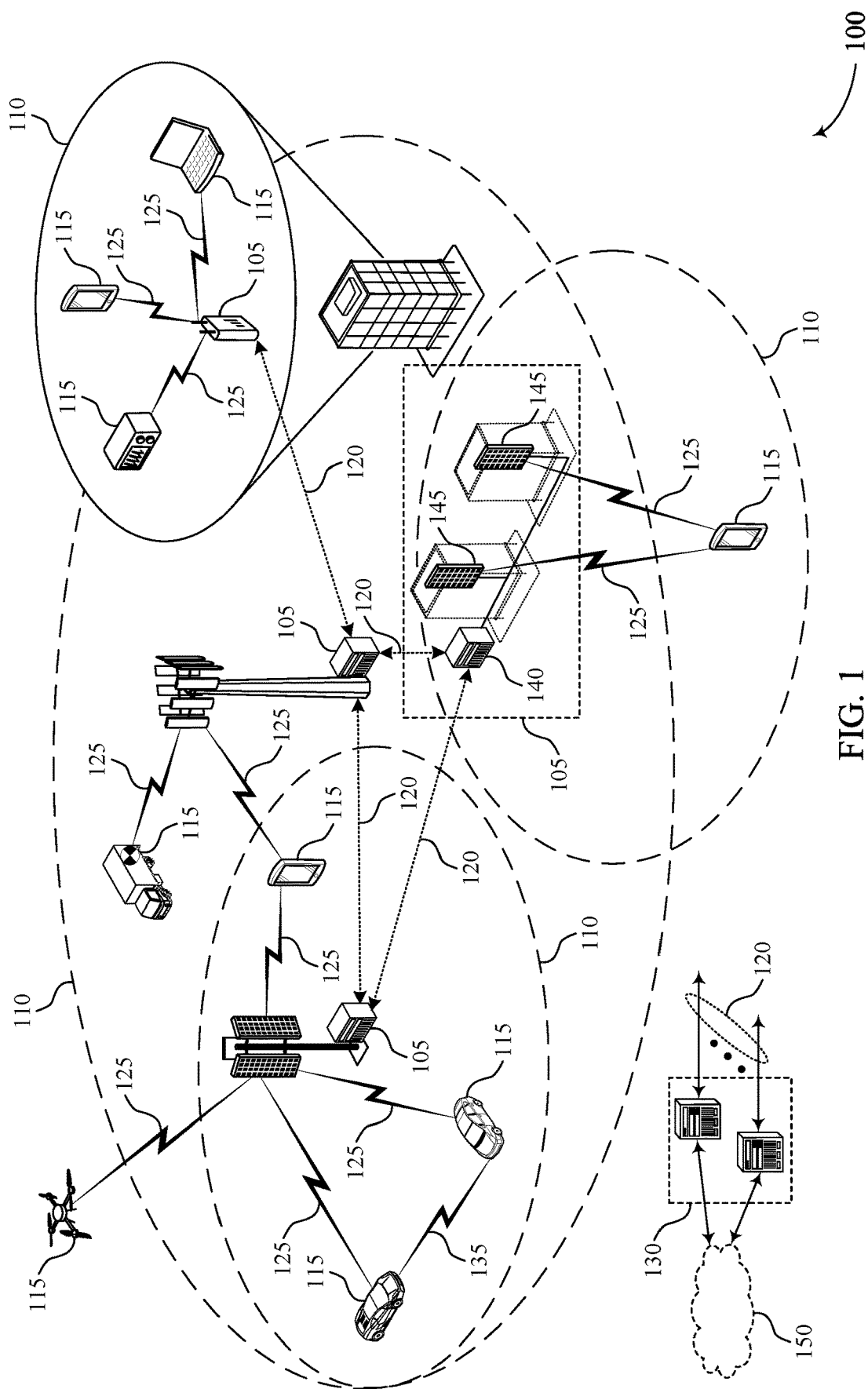
FIG. 1 illustrates an example of a wireless communications system that supports intra-device collision handling in accordance with aspects of the present disclosure.

In some wireless communications systems, a base station may assign or grant downlink resources to a user equipment (UE) on a first channel (e.g., a first physical downlink shared channel (PDSCH)), which may be associated with a lower priority (e.g., enhanced mobile broadband (eMBB)) for transmission of downlink data (e.g., a data packet). The base station may also assign downlink resources to the UE on a second channel (e.g., a second PDSCH), which may be associated with a higher priority (e.g., ultra-reliable low latency communications (URLLC)), where the first and the second PDSCH may overlap in time or overlap in both time and frequency. For example, the second, higher priority PDSCH may be scheduled in time-frequency resources that overlap the first, lower priority PDSCH. In some cases, the second PDSCH may be scheduled after the first PDSCH (e.g., the second PDSCH may be scheduled later in time), where the second, higher priority is based on the scheduling timing of the second PDSCH. The priority may be indicated to the UE using a number of different techniques, including transmission timing, control signaling characteristics, etc.

In some examples, the base station may configure (e.g., via radio resource control (RRC) signaling or other control signaling) one or more resources for the UE to perform PDSCH rate-matching or de-rate matching, and the UE may de-rate match an assigned PDSCH, such as the first PDSCH or the second PDSCH, around the configured resources. In some cases, the UE may be capable of processing data sent on the overlapping portions of both the first and second PDSCH. Additionally or alternatively, the UE may not be capable of processing data sent on the overlapping portions of the first and second PDSCH and may process the higher priority (e.g., second) PDSCH. In one example, the UE may process non-overlapping portions of the first PDSCH and may not process overlapping (e.g., preempted) portions. The UE may also transmit a feedback message to the base station (e.g., acknowledgement (ACK) or negative ACK (NAK) feedback) based on the data.

In some cases, the UE may use a collision handling scheme to determine rate-matching resources when the first PDSCH and the second PDSCH overlap in time. For example, a rate-matching conflict may arise for the UE if the rate-matching configurations (e.g., the resources around which a UE is to perform rate-matching for a given channel) for the two PDSCHs do not overlap. The collision handling scheme may enable the UE to de-rate match the second PDSCH independent of any other rate-matching pattern or indicator for other shared channels (e.g., the first PDSCH). In some cases, the UE may determine to rate-match the second PDSCH around resources indicated within downlink control signaling associated with the second PDSCH (e.g., dynamic resources indicated in a corresponding scheduling grant). Additionally or alternatively (e.g., if rate-matching resources are not indicated in the control signaling), the UE may rate-match the second PDSCH around resources in accordance with rate-matching resources configured for higher reliability communications in RRC signaling. Performing one or both of these collision handling schemes may allow the UE to rate-match the first PDSCH and the second PDSCH around configured resources that independently overlap the two PDSCHs.

The UE may also use a collision handling scheme to determine ACK/NAK feedback procedures when the first PDSCH and the second PDSCH overlap in time. In some cases, the UE may generate an ACK bit for one or more preempted code blocks (CBs) of the first PDSCH and may process other CBs within a same code block group (CBG) or a transport block (TB) to produce ACK/NAK feedback (e.g., the UE may generate an ACK bit if all other CBs of the CBG or TB pass decoding or generate a NAK bit if one CB of the CBG or TB fails decoding or is not processed). Other CBs within the CBG or the TB may include CBs before the UE stops or starts processing preempted CBs of the first PDSCH or CBs after the last preempted symbol of the first PDSCH. The UE may send a feedback message to the base station based on the ACK bit generated for the preempted CBs and the ACK/NAK feedback generated for the other CBs. The base station may keep track of preempted resources (e.g., preempted CBs of the first PDSCH), and may retransmit any CBs that are preempted (e.g., even if an ACK is received from the UE for a CBG or TB that corresponded to preempted CBs).

Aspects of the disclosure are initially described in the context of wireless communications systems. Aspects of the disclosure are further illustrated by and described with reference to a downlink channel resource scheme, process flows, apparatus diagrams, system diagrams, and flowcharts that relate to intra-device collision handling.

FIG. 1 illustrates an example of a wireless communications system 100 that supports intra-device collision handling in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a bandwidth part (BWP)) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable.

Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), eMBB, or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support URLLC or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a base station may assign or grant downlink resources to a UE on a first PDSCH that may be associated with a lower priority communication type (e.g., eMBB) for transmission of downlink data (e.g., a data packet). The base station may also assign downlink resources to the UE on a second PDSCH that may be associated with a higher priority communication type (e.g., URLLC), where the first and the second PDSCH may overlap in time or overlap in both time and frequency. For example, the second, higher priority PDSCH may be scheduled over the first, lower priority PDSCH. In some cases, the second PDSCH may be scheduled after the first PDSCH, where the higher priority is based on the later scheduling of the second PDSCH. The communication type priority may be indicated to the UE using a number of different techniques, including transmission timing, control signaling characteristics, etc. In some cases, the UE may be capable of processing data sent on the overlapping portions of both the first and second PDSCH. Additionally or alternatively, the UE may not be capable of processing data sent on the overlapping portions of the first and second PDSCH and may process the higher priority (e.g., second) PDSCH. In one example, the UE may process non-overlapping portions of the first PDSCH and may not process overlapping (e.g., preempted) portions.

In some cases, the UE may use a collision handling scheme to determine rate-matching resources when the first PDSCH and the second PDSCH overlap in time. The collision handling scheme may ensure that the UE rate-matches the second PDSCH independent of any other rate-matching pattern or indicator for other shared channels (e.g., the first PDSCH). In some cases, the UE may rate-match the second PDSCH around resources indicated within downlink control signaling or RRC signaling associated with the second PDSCH (e.g., dynamic resources indicated in a corresponding scheduling grant or resources configured for higher reliability communications). The UE may also use a collision handling scheme to determine ACK/NAK feedback procedures. In some cases, the UE may generate an ACK bit for one or more preempted CBs of the first PDSCH and may process other CBs (e.g., non-preempted CBs) within a same CBG or a TB to produce ACK/NAK feedback. The UE may send a feedback message to the base station based on the ACK bit generated for the preempted CBs and the ACK/NAK feedback generated for the other CBs. The base station may keep track of preempted resources (e.g., preempted CBs of the first PDSCH), and may retransmit any CBs that are preempted (e.g., even if an ACK is received from the UE).

Figure 2:
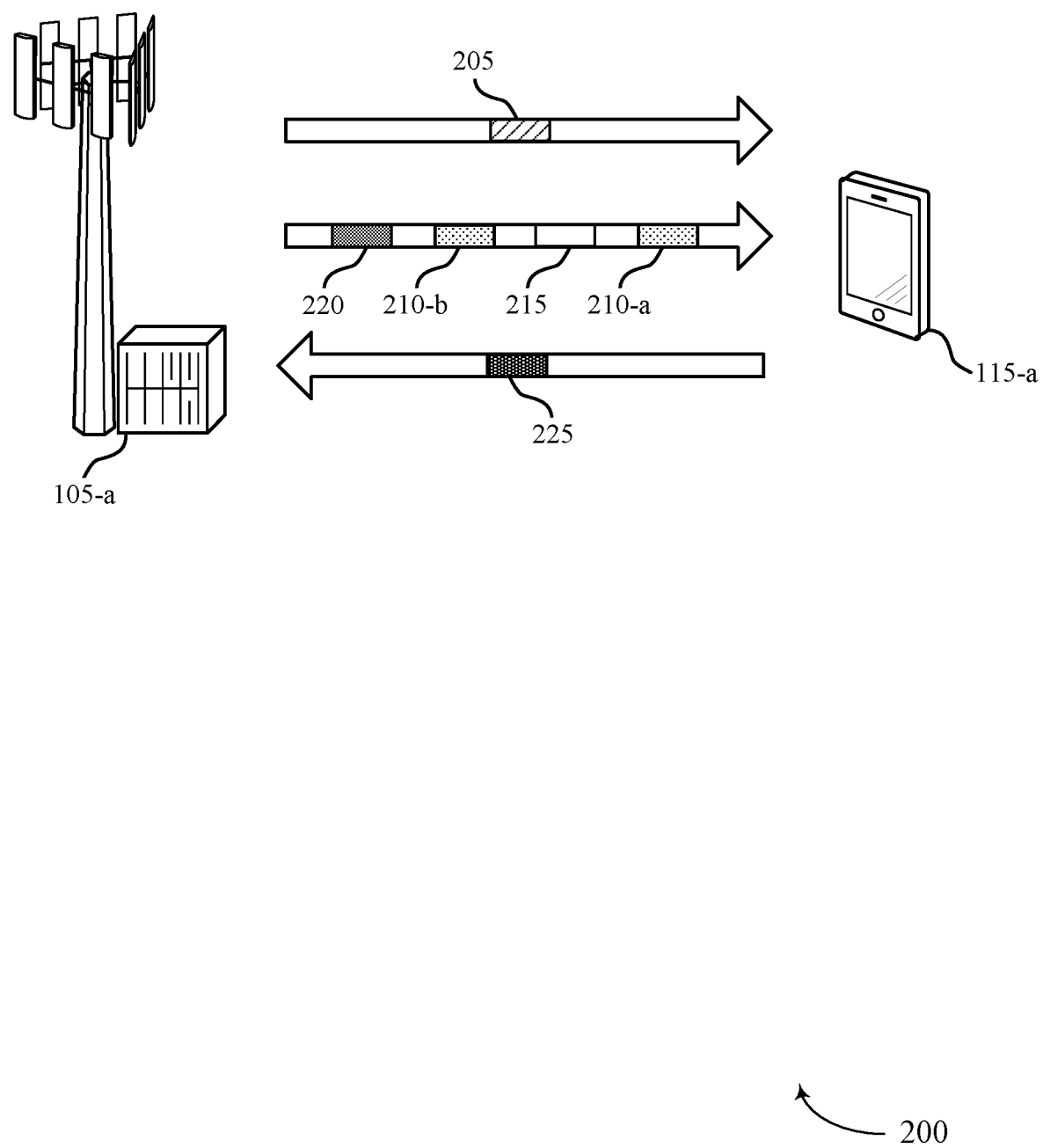
FIG. 2 illustrates an example of a wireless communications system that supports intra-device collision handling in accordance with aspects of the present disclosure.

FIG. 2 illustrates an example of a wireless communications system 200 that supports intra-device collision handling in accordance with aspects of the present disclosure. In some examples, wireless communications system 200 may implement aspects of wireless communications system 100 and may include a UE 115-a and a base station 105-a, which may be examples of a UE 115 and a base station 105 described with reference to FIG. 1. In some cases, base station 105-a may transmit downlink messages to UE 115-a via two separate, overlapping PDSCHs and UE 115-a may process the downlink messages according to a collision handling scheme.

For example, base station 105-a may assign (e.g., grant) downlink resources to UE 115-a on a first PDSCH associated with a lower priority communication type (e.g., eMBB) for transmission of a downlink data message 215 (e.g., data packet). Base station 105-a may also assign downlink resources to UE 115-a on a second PDSCH associated with a higher priority communication type (e.g., URLLC), where the first and the second PDSCH may overlap in time or overlap in both time and frequency. In some cases, base station 105-a may assign resources in the second PDSCH in order to send a higher priority (e.g., urgent) downlink data message 220 (e.g., data packet) to UE 115-a. For example, the second, higher priority PDSCH may be scheduled over the first, lower priority PDSCH. In some examples, the second PDSCH may be scheduled after (e.g., temporally subsequent to) the first PDSCH.

In some cases, the priority of the communication type may be based on a transmission time for downlink data messages 215 and 220. For example, if a downlink control message 210-a (e.g., downlink control information (DCI) of a physical downlink control channel (PDCCH)) scheduling downlink data message 215 on the first PDSCH is received before a downlink control message 210-b scheduling downlink data message 220 on the second PDSCH, the second PDSCH may have a higher priority than the first PDSCH. Additionally or alternatively, the priority of the communication type may be indicated based on a size of a downlink control message 210, a format of a downlink control message 210, a radio network temporary identifier (RNTI), a CORESET used for sending a downlink control message 210, a search space used for sending a downlink control message 210, or a bit indication in a downlink control message 210.

In some examples, base station 105-a may configure UE 115-a (e.g., prior to sending downlink control messages 210) via an RRC message 205 (e.g., RRC signaling). For example, base station 105-a may use RRC message 205 to configure one or more resources (e.g., resource blocks (RBs) or symbols) for UE 115-a to perform PDSCH de-rate matching. In some cases, UE 115-a may rate-match an assigned PDSCH, such as the first PDSCH or the second PDSCH, around the RRC-configured resources (e.g., unavailable resources). In some cases, the configured resources (e.g., RRC-configured resources) may be specific to certain priority communications (e.g., higher priority rate-matching resources, lower priority rate-matching resources). In some cases, base station 105-a may configure other resources for de-rate matching a particular PDSCH and may indicate the other resources to UE 115-a via a downlink grant (e.g., within a downlink control message 210) associated with the PDSCH. For example, base station 105-a may include a bitmap or rate-matching indicator within a downlink control message 210 (e.g., DCI on a PDCCH) that may request for UE 115-a to rate-match around the indicated resources.

In some cases, UE 115-a may use a collision handling scheme to determine rate-matching resources when the first PDSCH (e.g., carrying downlink data message 215) and the second PDSCH (e.g., carrying downlink data message 220) overlap in time. For example, a rate-matching conflict may arise for UE 115-a if the rate-matching configurations for the two PDSCHs do not overlap. In some wireless systems, the second PDSCH may be rate-matched around resources indicated in downlink control message 210-a (e.g., scheduling downlink data message 215 within the first PDSCH). However, the first PDSCH and the second PDSCH may have different reliability targets that may impact reception of downlink control messages 210. If UE 115-a were to not receive downlink control message 210-a (e.g., due to a lower reliability associated with downlink control message 210-a), UE 115-a may be unable to obtain rate-matching information for downlink data message 220 and the second PDSCH, which may impact reliability.

Therefore, the collision handling scheme may ensure that UE 115-a rate-matches the second PDSCH independent of any other rate-matching pattern or indicator for other shared channels (e.g., the first PDSCH). In some cases, UE 115-a may determine to rate-match the second PDSCH carrying the higher priority downlink data message 220 around resources indicated within downlink control message 210-b (e.g., dynamic resources indicated in the corresponding scheduling grant). Accordingly, base station 105-a may determine that the rate-matching resources are consistent with the second PDSCH (e.g., higher priority PDSCH). Additionally or alternatively (e.g., if rate-matching resources are not indicated in downlink control message 210-b), UE 115-a may rate-match the higher priority downlink data message 220 around resources configured for the second PDSCH (e.g., higher reliability communications) in RRC message 205. Performing one or both of these collision handling schemes may allow UE 115-a to rate-match the first PDSCH and the second PDSCH around configured resources that independently overlap the two PDSCHs.

In some cases, UE 115-a may be capable of processing both downlink data messages 215 and 220, (e.g., data sent on the overlapping portions of both the first and second PDSCH). Additionally or alternatively, UE 115-a may not be capable of processing data sent on the overlapping portions of the first and second PDSCH and UE 115-a may process downlink data message 220 on the higher priority (e.g., second) PDSCH. For example, UE 115-a may or may not process the overlapping portions of downlink data message 215 based on one or more conditions. In one example, UE 115-a may process non-overlapping portions of downlink data message 215 and may not process overlapping portions (e.g., preempted portions). UE 115-a may also transmit a feedback message 225 (e.g., ACK/NAK feedback) associated with downlink data message 215 or 220 to base station 105-a.

In some cases, feedback (e.g., ACK/NAK feedback) may be reported at a TB level or at a CBG level. For example, if UE 115-a is configured to transmit TB-level ACK/NAK feedback and one CB in a TB fails decoding (e.g., even if other CBs pass decoding), UE 115-a may send a NAK for the TB to base station 105-a in feedback message 225. Similarly, if UE 115-a is configured to transmit CBG-level ACK/NAK feedback and one CB in the CBG fails decoding (e.g., even if other CBs pass decoding), UE 115-a may send a NAK for the CBG to base station 105-a in feedback message 225.

UE 115-a may also use a collision handling scheme to determine ACK/NAK feedback procedures when the first PDSCH (e.g., carrying downlink data message 215) and the second PDSCH (e.g., carrying downlink data message 220) overlap in time. In some cases, UE 115-a may include a NAK in feedback message 225 in response to one or more preempted CBs within a CBG or a TB of the first PDSCH (e.g., corresponding to downlink data message 215). As used herein, a preempted CB or CBG may represent a fully-preempted or a partially-preempted CB or CBG (e.g., a CB or CBG partially overlapping with a second, higher-priority transmission). For example, a preempted CB or CBG may partially overlap symbols associated with the second PDSCH, where the first and the second PDSCH may overlap in time, frequency, or both. Additionally or alternatively, a preempted resource may include one or more CBs or CBGs following a last overlapping symbol (e.g., in cases where UE 115-a may terminate processing of the first PDSCH after the encountering the overlapping resources). In such cases, base station 105-a may determine that UE 115-a is not processing any CBs or CBGs after the last overlapping symbol and may consider these CBs or CBGs preempted.

If UE 115-a generates a NAK for the one or more preempted CBs, the NAK may then apply to the entire CBG or TB, even if UE 115-a successfully decodes other portions (e.g., one or more CBs) of the CBG or the TB. Accordingly, UE 115-a may generate an ACK for the one or more preempted CBs and may process other CBs within the CBG or the TB to produce ACK/NAK feedback as described herein (e.g., send an ACK if all CBs pass decoding or send a NAK if one CB fails decoding or if the CB is not processed). Other CBs within the CBG or the TB may include CBs before UE 115-a stops processing preempted CBs of the first PDSCH or CBs after the last preempted symbol of the first PDSCH. As discussed above, UE 115-a may additionally or alternatively stop processing other CBs of the first PDSCH after receiving downlink data message 220 on the second PDSCH.

In some cases (e.g., where all CBs in a TB or a CBG but the preempted CBs pass decoding), UE 115-a may include an ACK in feedback message 225 to base station 105-a for the TB or CBG. In some cases, one or more CBs in a TB or a CBG (other than the preempted CBs) may fail decoding and UE 115-a may include a NAK in feedback message 225 for the TB or CBG. Base station 105-a may keep track of preempted resources (e.g., preempted CBs of the first PDSCH or downlink data message 215), and may retransmit any CBs that are preempted (e.g., even if an ACK is received from UE 115-a).

Figure 3A:
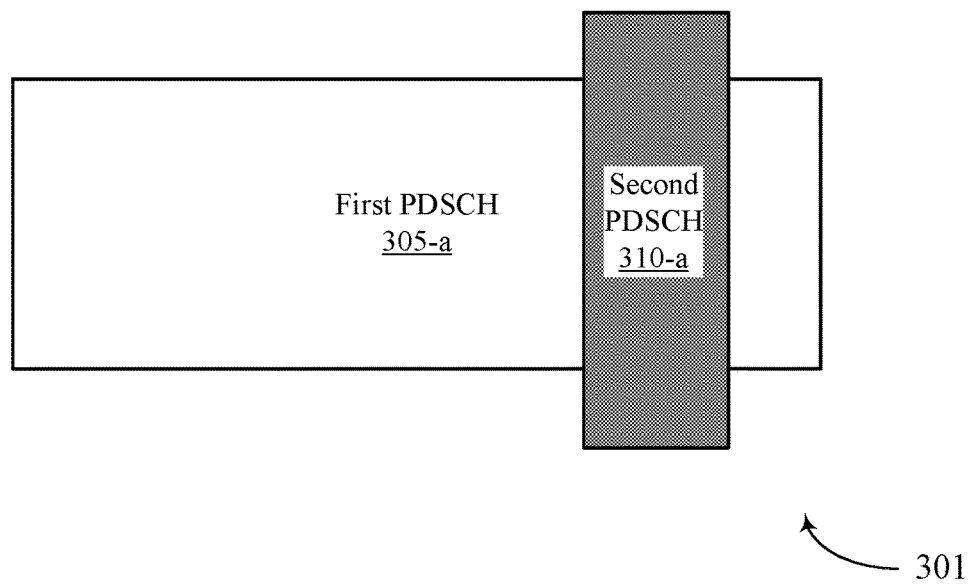
FIGS. 3A and 3B illustrate examples of downlink channel resource schemes that support intra-device collision handling in accordance with aspects of the present disclosure.

FIG. 3A illustrates an example of a downlink channel resource scheme 301 that supports intra-device collision handling in accordance with aspects of the present disclosure. In some examples, PDSCH resource scheme 301 may implement aspects of wireless communications systems 100 or 200 and may be implemented by a UE 115 and a base station 105, which may be examples of a UE 115 and a base station 105 described with reference to FIGS. 1 and 2. In some cases, the base station 105 may transmit downlink messages to the UE 115 via two separate, overlapping PDSCHs according to PDSCH resource scheme 301, and the UE 115 may process the downlink messages according to a collision handling scheme, as described with reference to FIG. 2.

For example, the base station 105 may assign (e.g., grant) downlink resources to the UE 115 on a first PDSCH 305-a that may in some cases be associated with a lower priority communication type (e.g., eMBB) for transmission of a downlink data message (e.g., data packet). The base station 105 may also assign downlink resources to the UE 115 on a second PDSCH 310-a that may in some examples be associated with a higher priority communication type (e.g., URLLC), where the first and the second PDSCH may overlap in both time and frequency. In some cases, the base station 105 may assign resources in the second PDSCH 310-a in order to send a higher priority (e.g., urgent) downlink data message (e.g., data packet) to the UE 115.

Accordingly, the UE 115 may process the data on the first PDSCH 305-a and the second PDSCH 310-a according to a collision handling scheme. In some cases, the UE 115 may determine to not process portions (e.g., data) of the first PDSCH 305-a that overlap with portions of the second PDSCH 310-a, which may be referred to as preempted portions (e.g., preempted CBs) of the first PDSCH 305-a. The UE 115 may use the collision handling scheme to identify resources around which the UE 115 may rate-match the second PDSCH 310-a. Additionally, the UE 115 may use the collision handling scheme to send ACK/NAK feedback to the base station 105 regarding data received on the first PDSCH 305-a.

As described with reference to FIG. 2, if UE 115-a were to not receive a downlink control message corresponding to the first PDSCH 305-a, the UE 115 may be unable to obtain rate-matching information for the second PDSCH 310-a, which may impact reliability of the second PDSCH 310-a.

Therefore, in some cases, the UE 115 may rate-match the second PDSCH 310-*a* around resources dynamically indicated in a corresponding scheduling grant, where the base station 105 may determine that the rate-matching resources are consistent. Additionally or alternatively (e.g., if rate-matching resources are not indicated in the scheduling grant), the UE 115 may rate-match around resources configured for the second PDSCH 310-*a* (e.g., higher reliability communications) in RRC signaling.

The UE 115 may also use a collision handling scheme to determine ACK/NAK feedback for a preempted CB of the first PDSCH 305-*a*, where a preempted CB may represent a fully-preempted or a partially-preempted CB (e.g., a CB partially overlapping with the second PDSCH 310-*a*). For example, a preempted CB or CBG may partially overlap symbols associated with the second PDSCH 310-*a*. Additionally or alternatively, a preempted resource may include one or more CBs or CBGs following the last overlapping symbol of the first PDSCH 305-*a* and the second PDSCH 310-*a* (e.g., in cases where the UE 115 may terminate processing of the first PDSCH 305-*a* after the encountering the overlapping resources). In such cases, the base station 105 may determine that the UE 115 is not processing any CBs or CBGs after the last overlapping symbol and may consider these CBs or CBGs preempted.

The UE 115 may generate an ACK for the preempted CB and may process non-preempted CBs within a CBG or a TB of the first PDSCH 305-*a* to produce ACK/NAK feedback. For example, the UE 115 may send an ACK if all non-preempted CBs in a CBG or a TB pass decoding or send a NAK if one non-preempted CB fails decoding or if one non-preempted CB is not processed. In some cases where all CBs but the preempted CBs pass decoding, the UE 115 may transmit an ACK to the base station 105. The base station 105 may keep track of preempted resources (e.g., preempted CBs of the first PDSCH 305-*a*), and may retransmit any CBs that are preempted (e.g., even if an ACK is received from the UE 115).

Figure 3B:
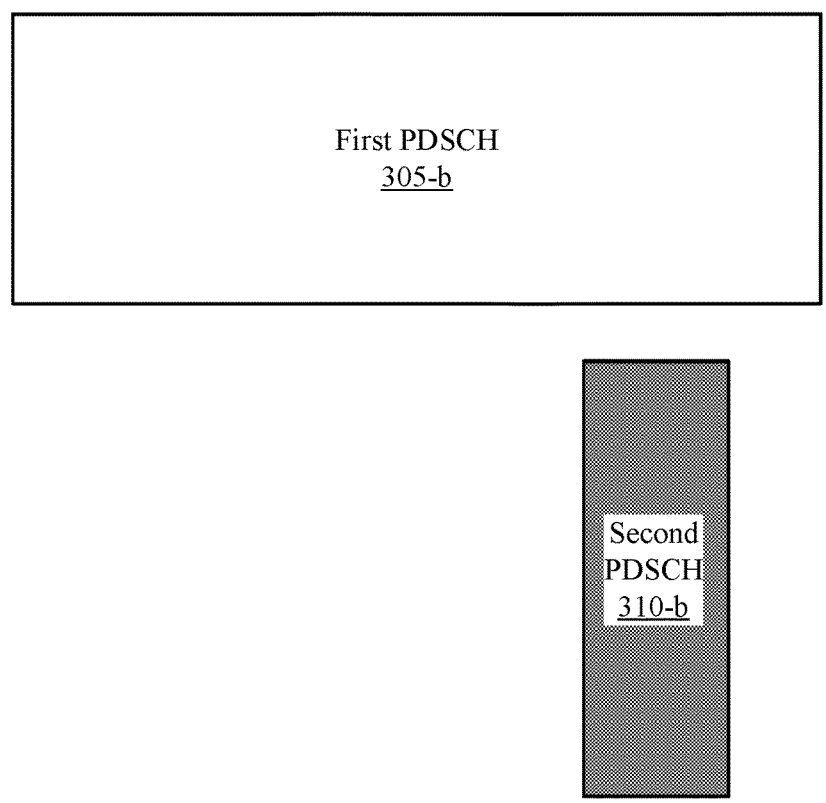

FIG. 3B illustrates an example of a downlink channel resource scheme 302 that supports intra-device collision handling in accordance with aspects of the present disclosure. In some examples, PDSCH resource scheme 302 may implement aspects of wireless communications systems 100 or 200 and may be implemented by a UE 115 and a base station 105, which may be examples of a UE 115 and a base station 105 described with reference to FIGS. 1 and 2. In some cases, the base station 105 may transmit downlink messages to the UE 115 via two separate, overlapping PDSCHs according to PDSCH resource scheme 302, and the UE 115 may process the downlink messages according to a collision handling scheme, as described with reference to FIG. 2.

For example, the base station 105 may assign (e.g., grant) downlink resources to the UE 115 on a first PDSCH 305-*b* associated with a lower priority communication type (e.g., eMBB) for transmission of a downlink data message (e.g., data packet). The base station 105 may also assign downlink resources to the UE 115 on a second PDSCH 310-*b* associated with a higher priority communication type (e.g., URLLC), where the first and the second PDSCH may overlap in frequency. In some cases, the base station 105 may assign resources in the second PDSCH 310-*b* in order to send a higher priority (e.g., urgent) downlink data message (e.g., data packet) to the UE 115.

Accordingly, the UE 115 may process the data on the first PDSCH 305-*b* and the second PDSCH 310-*b* according to a collision handling scheme. In some cases, the UE 115 may determine to not process portions (e.g., data) of the first PDSCH 305-*b* that overlap with portions of the second PDSCH 310-*b*, which may be referred to as preempted portions (e.g., preempted CBs) of the first PDSCH 305-*b*. The UE 115 may use the collision handling scheme to identify resources around which the UE 115 may rate-match the second PDSCH 310-*b*. Additionally, the UE 115 may use the collision handling scheme to send ACK/NAK feedback to the base station 105 regarding data received on the first PDSCH 305-*b*.

As described with reference to FIG. 2, if UE 115-*b* were to not receive a downlink control message corresponding to the first PDSCH 305-*b*, the UE 115 may be unable to obtain rate-matching information for the second PDSCH 310-*b*, which may impact reliability of the second PDSCH 310-*b*. Therefore, in some cases, the UE 115 may rate-match the second PDSCH 310-*b* around resources dynamically indicated in a corresponding scheduling grant, where the base station 105 may determine that the rate-matching resources are consistent. Additionally or alternatively (e.g., if rate-matching resources are not indicated in the scheduling grant), the UE 115 may rate-match around resources configured for the second PDSCH 310-*b* (e.g., higher reliability communications) in RRC signaling.

The UE 115 may also use a collision handling scheme to determine ACK/NAK feedback for a preempted CB of the first PDSCH 305-*b*, where a preempted CB may represent a fully-preempted or a partially-preempted CB (e.g., a CB partially overlapping with the second PDSCH 310-*b*). For example, a preempted CB or CBG may partially overlap symbols associated with the second PDSCH 310-*b*. Additionally or alternatively, a preempted resource may include one or more CBs or CBGs following the last overlapping symbol of the first PDSCH 305-*b* and the second PDSCH 310-*b* (e.g., in cases where the UE 115 may terminate processing of the first PDSCH 305-*b* after the encountering the overlapping resources). In such cases, the base station 105 may determine that the UE 115 is not processing any CBs or CBGs after the last overlapping symbol and may consider these CBs or CBGs preempted.

The UE 115 may generate an ACK for the preempted CB and may process non-preempted CBs within a CBG or a TB of the first PDSCH 305-*b* to produce ACK/NAK feedback. For example, the UE 115 may send an ACK if all non-preempted CBs in a CBG or a TB pass decoding or send a NAK if one non-preempted CB fails decoding or if one non-preempted CB is not processed. Accordingly, in some cases where all CBs but the preempted CBs pass decoding, the UE 115 may transmit an ACK to the base station 105. The base station 105 may keep track of preempted resources (e.g., preempted CBs of the first PDSCH 305-*b*), and may retransmit any CBs that are preempted (e.g., even if an ACK is received from the UE 115).

Figure 4:
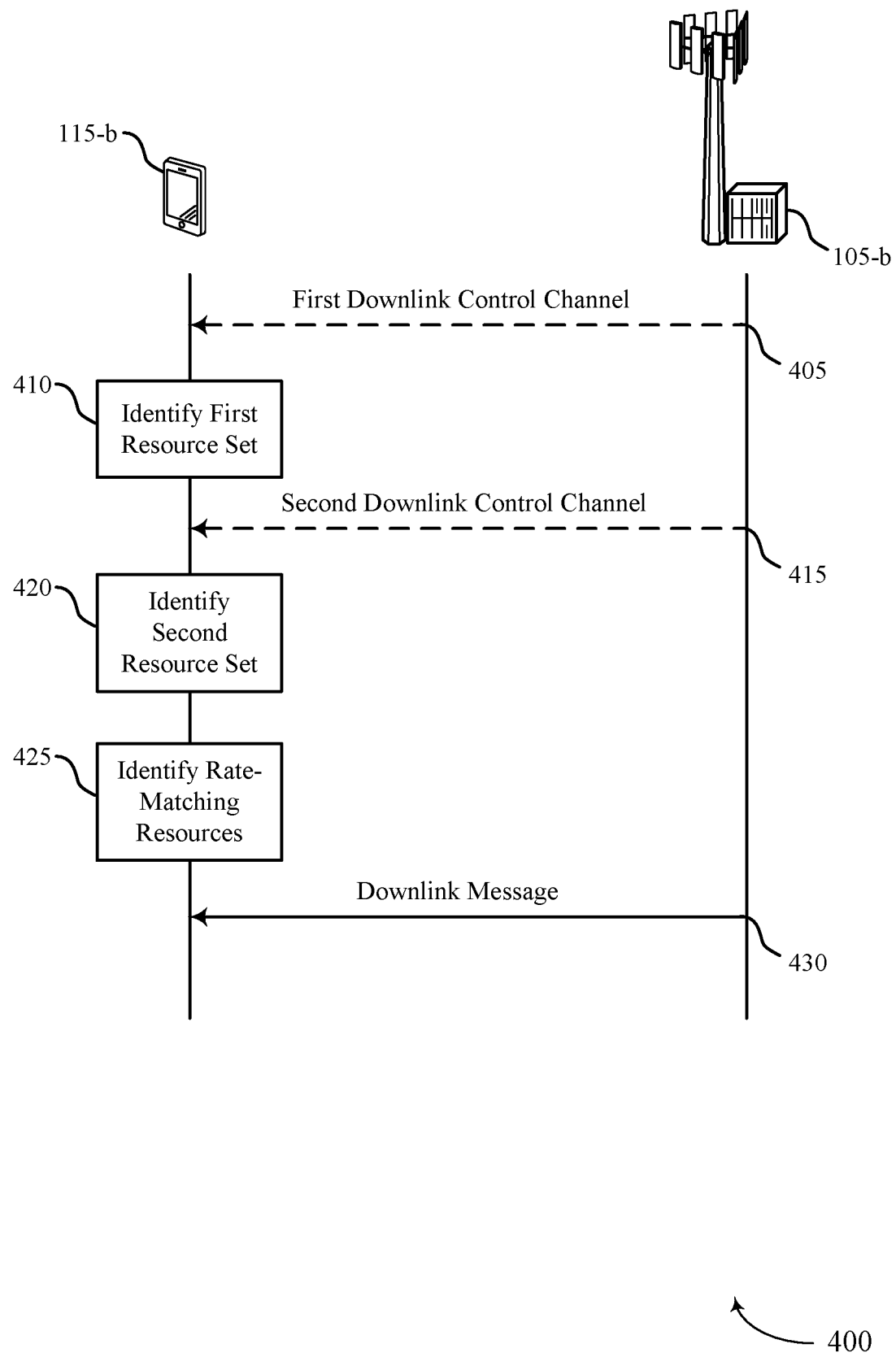
FIGS. 4 and 5 illustrate examples of process flows that support intra-device collision handling in accordance with aspects of the present disclosure.

FIG. 4 illustrates an example of a process flow 400 that supports intra-device collision handling in accordance with aspects of the present disclosure. In some examples, process flow 400 may implement aspects of wireless communications system 100 or 200 and may be implemented by a UE 115-*b* and a base station 105-*b*, which may be examples of a UE 115 and a base station 105 described with reference to FIGS. 1-3. In some cases, base station 105-*b* may assign resources for transmitting downlink data to UE 115-*b* via two separate, overlapping PDSCHs and UE 115-*b* may process the PDSCHs according to a collision handling scheme.

In the following description of the process flow 400, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 400, or other operations may be added to the process flow 400. It is to be understood that while base station 105-*b* and UE 115-*b* are shown performing a number of the operations of process flow 400, any wireless device may perform the operations shown.

At 405, in some cases, base station 105-*b* may transmit, to UE 115-*b*, a first downlink control channel (e.g., a downlink control message on a PDCCH) that indicates a first set of resources. In some cases, the first downlink control channel may include first DCI for the first downlink shared channel, the first DCI indicating rate-matching resources configured for the first downlink shared channel.

At 410, UE 115-*b* may identify the first set of resources scheduled for downlink communications on a first downlink shared channel (e.g., PDSCH) for UE 115-*b*, and in some examples, the first downlink shared channel may be associated with a first priority (e.g., a lower priority). In some cases, UE 115-*b* may identify the first set of resources based on the first downlink control channel transmission.

At 415, in some cases, base station 105-*b* may transmit, to UE 115-*b*, a second downlink control channel (e.g., a downlink control message on a PDCCH) that indicates a second set of resources. In some cases, the second downlink control channel may include second DCI for the second downlink shared channel, the second DCI indicating a set of rate-matching resources configured for the second downlink shared channel.

At 420, UE 115-*b* may identify the second set of resources scheduled for downlink communications on a second downlink shared channel (e.g., PDSCH for UE 115-*b*, and in some examples the second downlink shared channel may have a second priority which may be higher than the first priority), where the second set of resources at least partially overlaps the first set of resources. In some cases, UE 115-*b* may identify the second set of resources based on the second downlink control channel transmission. In some examples, the second set of resources may at least partially overlap the first set of resources in time. In some examples, the second set of resources may at least partially overlap the first set of resources in time and frequency.

At 425, UE 115-*b* may identify the set of rate-matching resources configured for the second downlink shared channel. In some cases, rate-matching resources configured for the first downlink shared channel may at least partially overlap the set of rate-matching resources configured for the second downlink shared channel. In some cases, identifying the set of rate-matching resources for the second downlink shared channel may include receiving an indication of the set of rate-matching resources configured for the second downlink shared channel as a set of shared channel rate-matching resources associated with the second priority, where the rate-matching resources configured for the first downlink shared channel are associated with the first priority. In some examples, the indication of the set of rate-matching resources for the second downlink shared channel may be received via RRC signaling.

At 430, UE 115-*b* may obtain a downlink message on the second downlink shared channel by de-rate matching around the set of rate-matching resources independent of any rate-matching resources configured for the first downlink shared channel.

Figure 5:
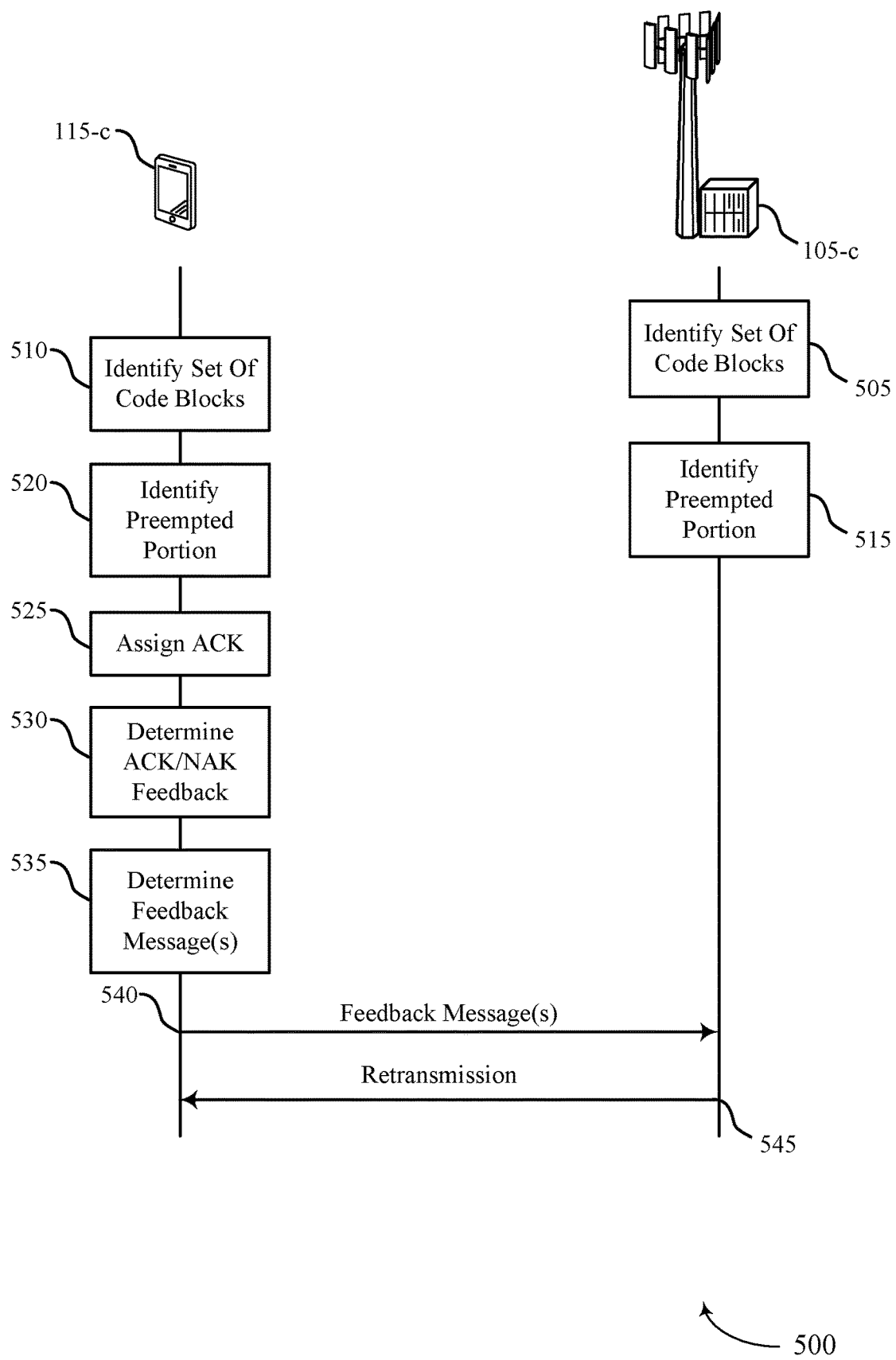

FIG. 5 illustrates an example of a process flow 500 that supports intra-device collision handling in accordance with aspects of the present disclosure. In some examples, process flow 500 may implement aspects of wireless communications systems 100 or 200 and may be implemented by a UE 115-*c* and a base station 105-*c*, which may be examples of a UE 115 and a base station 105 described with reference to FIGS. 1-3. In some cases, base station 105-*c* may assign resources for transmitting downlink data to UE 115-*c* via two separate, overlapping PDSCHs and UE 115-*c* may process the PDSCHs according to a collision handling scheme.

In the following description of the process flow 500, the operations between UE 115-*c* and base station 105-*c* may be transmitted in a different order than the order shown, or the operations performed by base station 105-*c* and UE 115-*c* may be performed in different orders or at different times. Certain operations may also be left out of the process flow 500, or other operations may be added to the process flow 500. It is to be understood that while base station 105-*c* and UE 115-*c* are shown performing a number of the operations of process flow 500, any wireless device may perform the operations shown.

At 505, base station 105-*c* may identify a set of CBs of a downlink shared channel (e.g., PDSCH) for UE 115-*c*, in some examples, the downlink shared channel may be associated with a first priority (e.g., a lower priority).

At 510, UE 115-*c* may identify the set of CBs of the downlink shared channel (e.g., PDSCH) for UE 115-*c*, the downlink shared channel associated with the first priority (e.g., lower priority).

At 515, base station 105-*c* may identify that a portion of the set of CBs is at least partially preempted by a transmission, where the transmission may be associated with a second priority higher than the first priority.

At 520, UE 115-*c* may identify that a portion of the set of CBs is preempted by a transmission of a second priority higher than the first priority. In some cases, the second, higher priority may be associated with a subsequent transmission.

At 525, UE 115-*c* may assign an ACK bit to each CB that is at least partially preempted by the transmission. In some cases, UE 115-*c* may refrain from assigning a NAK feedback bit to each CB that is at least partially preempted by the transmission.

At 530, UE 115-*c* determine either an ACK bit or a NAK bit for each of the set of CBs that are not at least partially preempted. In some cases, UE 115-*c* may perform a decoding process on each of the set of CBs that are not at least partially preempted and determine feedback for each of the set of CBs that are not at least partially preempted based on the decoding process.

At 535, UE 115-*c* determine one or more feedback messages based on the ACK bits or the NAK bits assigned to or determined for each of the set of CBs.

At 540, UE 115-*c* may transmit, to base station 105-*c*, the one or more feedback messages to report feedback for the set of CBs, where at least one of the one or more feedback messages corresponds to the portion of the set of CBs that is at least partially preempted by the transmission. In some cases, UE 115-*c* may transmit respective feedback messages for each CBG associated with the set of CBs, where each CBG may include multiple CBs of the set of CBs. In some cases, UE 115-*c* may transmit respective feedback messages for each TB associated with the set of CBs, where each TB may include multiple CBs of the set of CBs.

At 545, base station 105-*c* may retransmit the portion of the set of CBs that were at least partially preempted, regardless of whether the at least one of the one or more feedback messages indicates an ACK or a NAK.

Figure 6:
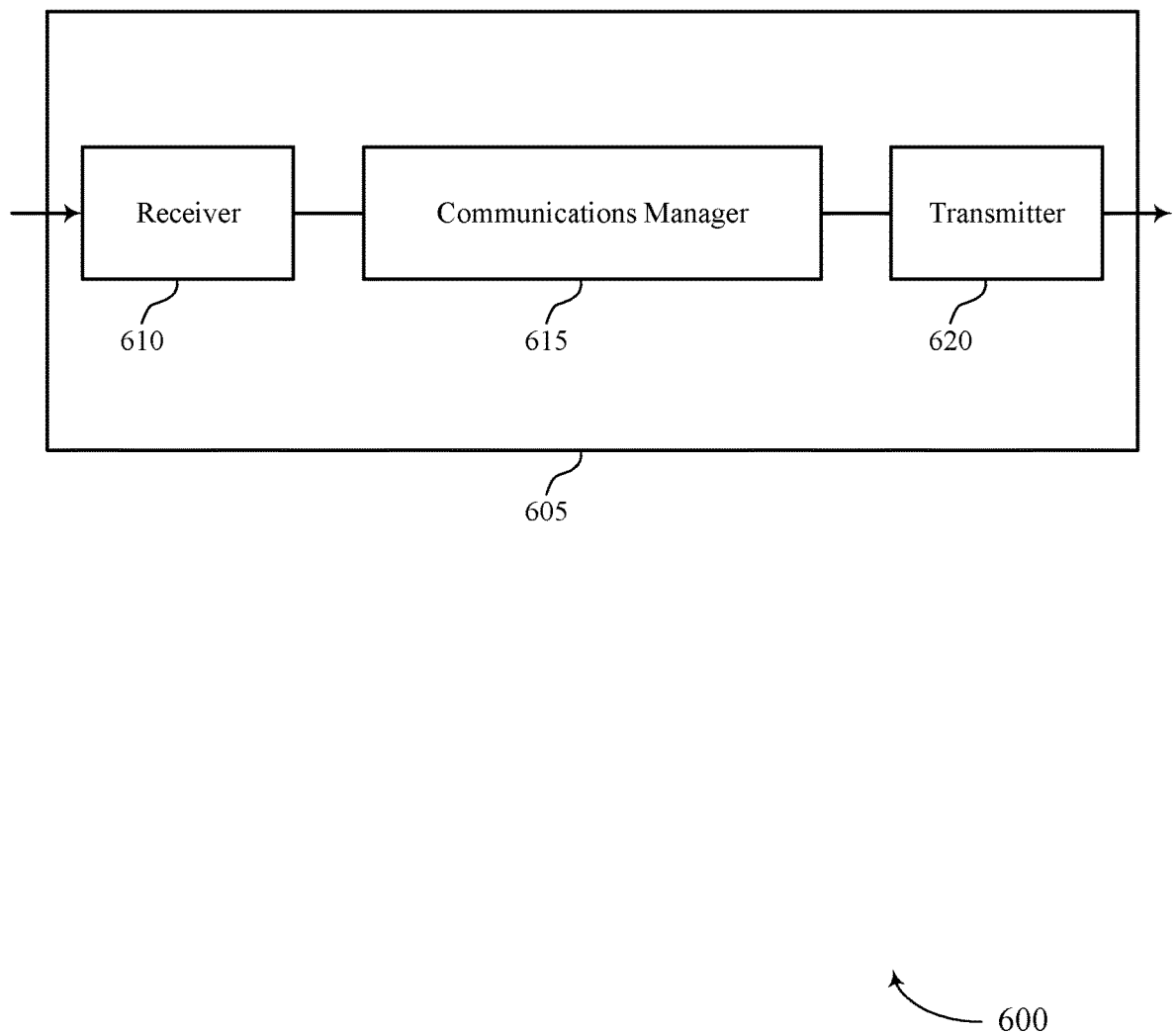
FIGS. 6 and 7 show block diagrams of devices that support intra-device collision handling in accordance with aspects of the present disclosure.

FIG. 6 shows a block diagram 600 of a device 605 that supports intra-device collision handling in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to intra-device collision handling, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a first set of resources scheduled for downlink communications on a first downlink shared channel for the UE, identify a second set of resources scheduled for downlink communications on a second downlink shared channel for the UE, where the second set of resources at least partially overlaps the first set of resources, identify a set of rate-matching resources configured for the second downlink shared channel, and obtain a downlink message on the second downlink shared channel by de-rate matching around the set of rate-matching resources independent of any rate-matching resources configured for the first downlink shared channel. In some examples, the first downlink shared channel may be associated with a first priority and the second downlink shared channel may be associated with a second priority. In some cases, the second priority may be greater than the first priority.

The communications manager 615 may also identify a set of CBs of a downlink shared channel for the UE, identify that a portion of the set of CBs is preempted by a transmission, assign an ACK bit to each CB that is at least partially preempted by the transmission, determine either an ACK bit or a NAK bit for each of the set of CBs that are not at least partially preempted, determine one or more feedback messages based on the ACK bits or the NAK bits assigned to or determined for each of the set of CBs, and transmit the one or more feedback messages to report feedback for the set of CBs. In some examples, the first downlink shared channel may be associated with a first priority and the transmission may be associated with a second priority. In some cases, the second priority may be greater than the first priority. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception over one or more bands.

The actions performed by the communications manager 615 as described herein may be implemented to realize one or more potential advantages. For example, communications manager 615 may decrease communication latency and increase communication reliability at a UE 115 by allowing the UE 115 to correctly process higher priority communications. Similarly, communications manager 615 may decrease latency in lower priority communications at a UE 115 by decreasing a number of HARQ retransmissions. The improvements in communication latency and reliability may further save power and increase battery life at a UE 115 (e.g., by reducing complexity and reducing a number of retransmissions to be received).

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, communications manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception.

The communications manager 615 as described herein may be implemented to realize one or more potential advantages. Various implementations may enable the communications manager 615 to effectively rate match overlapping scheduled downlink transmission resources, and provide feedback based on receiving the resources. At least one implementation may enable the communications manager 615 to determine a priority of a second transmission is higher than a priority of a first transmission based on the second transmissions being scheduled at a later time.

Based on implementing the intra-device collision handling techniques as described herein, one or more processors of the device 605 (e.g., processor(s) controlling or incorporated with one or more of receiver 610, communications manager 615, and transmitter 620) may reduce latency for URLLC communications, increase communications reliability, and improve scheduling efficiency in the wireless network.

Figure 7:
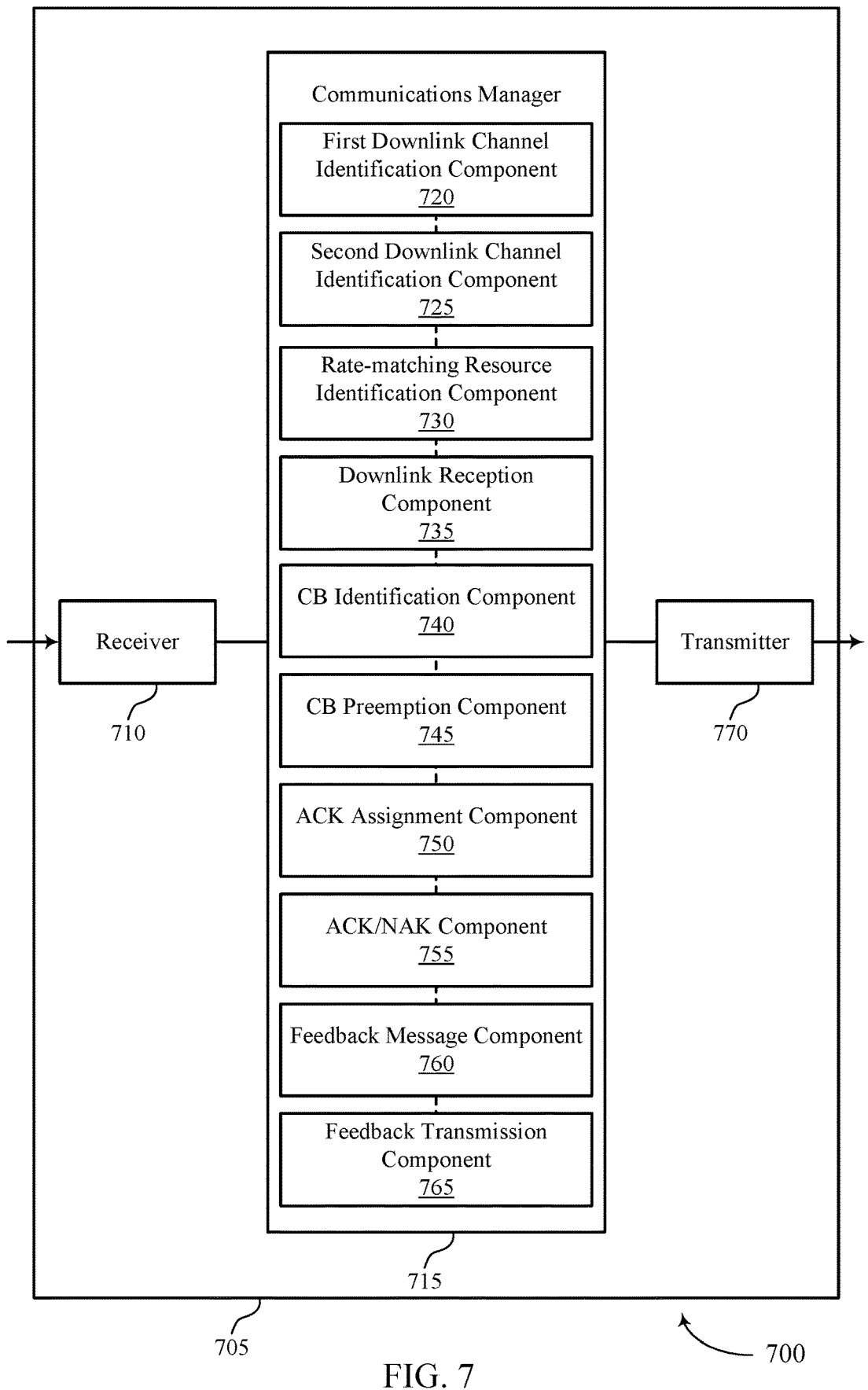

FIG. 7 shows a block diagram 700 of a device 705 that supports intra-device collision handling in accordance with aspects of the present disclosure. The device 705 may be an example of aspects of a device 605, or a UE 115 as described herein. The device 705 may include a receiver 710, a communications manager 715, and a transmitter 770. The device 705 may also include a processor. Each of these components may be in communication with one another (e.g., via one or more buses).

The receiver 710 may receive information such as packets, user data, or control information associated with various information channels (e.g., control channels, data channels, and information related to intra-device collision handling, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a first downlink channel identification component 720, a second downlink channel identification component 725, a rate-matching resource identification component 730, a downlink reception component 735, a CB identification component 740, a CB preemption component 745, an ACK assignment component 750, an ACK/NAK component 755, a feedback message component 760, and a feedback transmission component 765. The communications manager 715 may be an example of aspects of the communications manager 910 described herein.

The first downlink channel identification component 720 may identify a first set of resources scheduled for downlink communications on a first downlink shared channel for the UE. The second downlink channel identification component 725 may identify a second set of resources scheduled for downlink communications on a second downlink shared channel for the UE, where the second set of resources at least partially overlaps the first set of resources. In some examples, the first downlink shared channel may be associated with a first priority and the second downlink shared channel may be associated with a second priority. In some cases, the second priority may be greater than the first priority.

The rate-matching resource identification component 730 may identify a set of rate-matching resources configured for the second downlink shared channel. The downlink reception component 735 may obtain a downlink message on the second downlink shared channel by de-rate matching around the set of rate-matching resources independent of any rate-matching resources configured for the first downlink shared channel.

The CB identification component 740 may identify a set of CBs of a downlink shared channel for the UE. The CB preemption component 745 may identify that a portion of the set of CBs is preempted by a transmission. The ACK assignment component 750 may assign an ACK bit to each CB that is at least partially preempted by the transmission. In some examples, the first downlink shared channel may be associated with a first priority and the transmission may be associated with a second priority. In some cases, the second priority may be greater than the first priority. The ACK/NAK component 755 may determine either an ACK bit or a NAK bit for each of the set of CBs that are not at least partially preempted. The feedback message component 760 may determine one or more feedback messages based on the ACK bits or the NAK bits assigned to or determined for each of the set of CBs. The feedback transmission component 765 may transmit the one or more feedback messages to report feedback for the set of CBs.

The transmitter 770 may transmit signals generated by other components of the device 705. In some examples, the transmitter 770 may be collocated with a receiver 710 in a transceiver module. For example, the transmitter 770 may be an example of aspects of the transceiver 920 described with reference to FIG. 9. The transmitter 770 may utilize a single antenna or a set of antennas.

A processor of a UE 115 (e.g., controlling the receiver 710, the transmitter 770, or the transceiver 920 as described with reference to FIG. 9) may decrease communication latency and increase communication reliability through rate-matching and HARQ feedback processes (e.g., via implementation of system components described with reference to FIG. 8). Further, the processor of UE 115 may receive an indication of rate-matching resources to perform the processes described herein. The processor of the UE 115 may use the rate-matching resources and a HARQ feedback process to improve communication latency and reliability to further save power and increase battery life at the UE 115 (e.g., by reducing complexity and reducing a number of retransmissions to be received).

Figure 8:
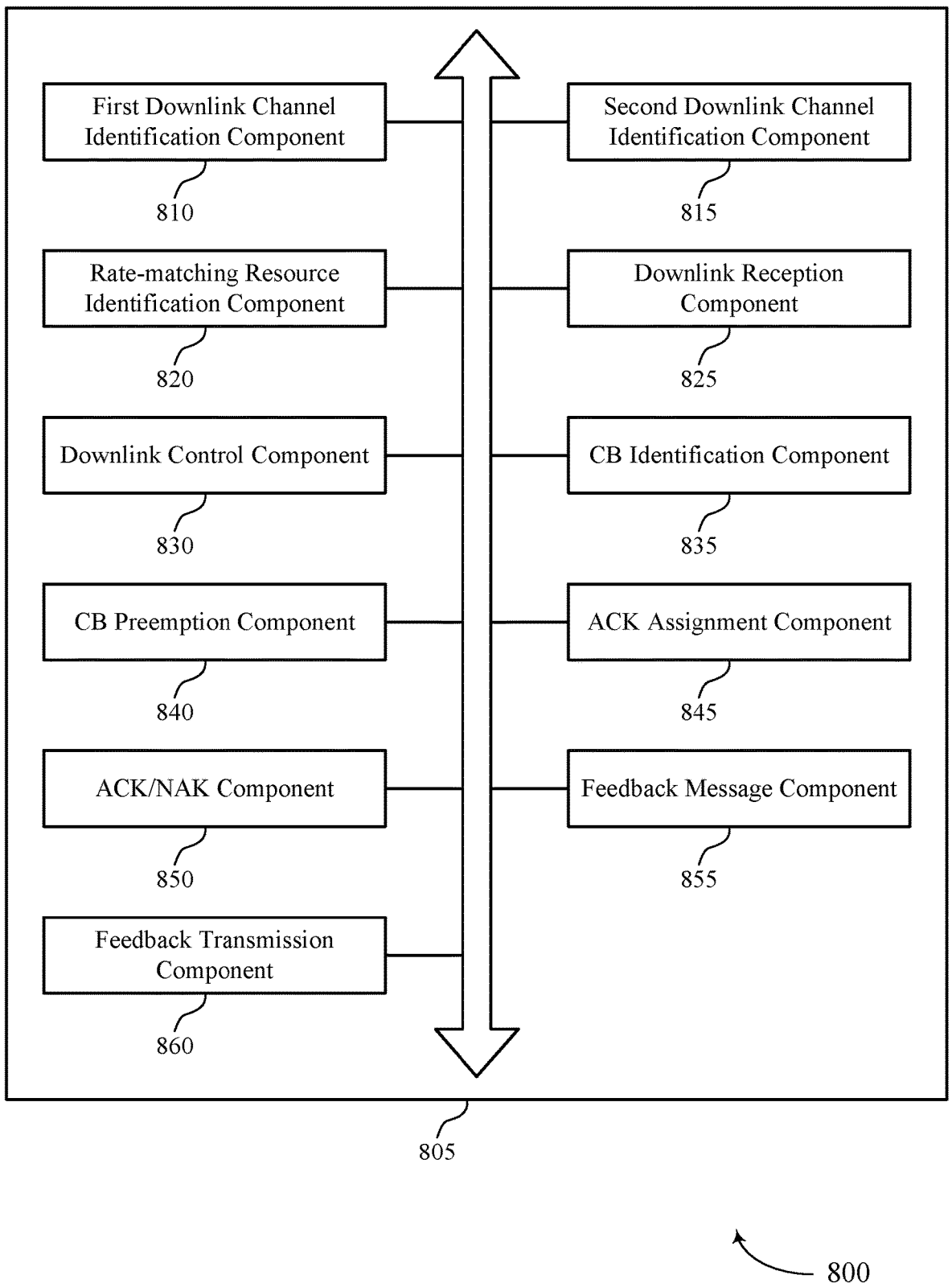
FIG. 8 shows a block diagram of a communications manager that supports intra-device collision handling in accordance with aspects of the present disclosure.

FIG. 8 shows a block diagram 800 of a communications manager 805 that supports intra-device collision handling in accordance with aspects of the present disclosure. The communications manager 805 may be an example of aspects of a communications manager 615, a communications manager 715, or a communications manager 910 described herein. The communications manager 805 may include a first downlink channel identification component 810, a second downlink channel identification component 815, a rate-matching resource identification component 820, a downlink reception component 825, a downlink control component 830, a CB identification component 835, a CB preemption component 840, an ACK assignment component 845, an ACK/NAK component 850, a feedback message component 855, and a feedback transmission component 860. Each of these modules may communicate, directly or indirectly, with one another (e.g., via one or more buses).

The first downlink channel identification component 810 may identify a first set of resources scheduled for downlink communications on a first downlink shared channel for the UE.

The second downlink channel identification component 815 may identify a second set of resources scheduled for downlink communications on a second downlink shared channel for the UE, where the second set of resources at least partially overlaps the first set of resources. In some cases, the second set of resources at least partially overlaps the first set of resources in time. In some cases, the second set of resources at least partially overlaps the first set of resources in time and frequency.

In some examples, the first downlink channel identification component 810 and the second downlink channel identification component 815 may identify a first priority associated with the first downlink shared channel and a second priority associated with the second downlink shared channel. In some examples, the second priority may be higher than the first priority.

The rate-matching resource identification component 820 may identify a set of rate-matching resources configured for the second downlink shared channel. In some examples, the rate-matching resource identification component 820 may receive an indication of the set of rate-matching resources configured for the second downlink shared channel as a set of shared channel rate-matching resources associated with the second priority, where the rate-matching resources configured for the first downlink shared channel are associated with the first priority. In some cases, the rate-matching resources configured for the first downlink shared channel at least partially overlap the set of rate-matching resources configured for the second downlink shared channel. In some cases, an indication of the set of shared channel rate-matching resources is received via RRC signaling.

The downlink reception component 825 may obtain a downlink message on the second downlink shared channel by de-rate matching around the set of rate-matching resources independent of any rate-matching resources configured for the first downlink shared channel. The downlink control component 830 may receive a first downlink control channel that indicates the first set of resources. In some examples, the downlink control component 830 may receive a second downlink control channel that indicates the second set of resources. In some cases, the first downlink control channel includes first DCI for the first downlink shared channel, the first DCI indicating the rate-matching resources configured for the first downlink shared channel. In some cases, the second downlink control channel includes second DCI for the second downlink shared channel, the second DCI indicating the set of rate-matching resources configured for the second downlink shared channel.

The CB identification component 835 may identify a set of CBs of a downlink shared channel for the UE. The CB preemption component 840 may identify that a portion of the set of CBs is preempted by a transmission. In some examples, the first downlink shared channel may be associated with a first priority and the transmission may be associated with a second priority. In some cases, the second priority may be greater than the first priority. The ACK assignment component 845 may assign an acknowledgement bit to each CB that is at least partially preempted by the transmission. In some examples, the ACK assignment component 845 may refrain from assigning a NAK feedback bit to each CB that is at least partially preempted by the transmission.

The ACK/NAK component 850 may determine either an ACK bit or a NAK bit for each of the set of CBs that are not at least partially preempted. In some examples, the ACK/NAK component 850 may perform a decoding process on each of the set of CBs that are not at least partially preempted. In some examples, the ACK/NAK component 850 may determine feedback for each of the set of CBs that are not at least partially preempted based on the decoding process.

The feedback message component 855 may determine one or more feedback messages based on the ACK bits or the NAK bits assigned to or determined for each of the set of CBs. The feedback transmission component 860 may transmit the one or more feedback messages to report feedback for the set of CBs. In some examples, transmitting respective feedback messages for each CBG associated with the set of CBs, where each CBG includes multiple CBs of the set of CBs. In some examples, transmitting respective feedback messages for each TB associated with the set of CBs, where each TB includes multiple CBs of the set of CBs.

The downlink control component 830 may receive a first downlink control channel that indicates the first set of resources. In some examples, the downlink control component 830 may receive a second downlink control channel that indicates the second set of resources. In some cases, the first downlink control channel includes first DCI for the first downlink shared channel, the first DCI indicating the rate-matching resources configured for the first downlink shared channel. In some cases, the second downlink control channel includes second DCI for the second downlink shared channel, the second DCI indicating the set of rate-matching resources configured for the second downlink shared channel.

Figure 9:
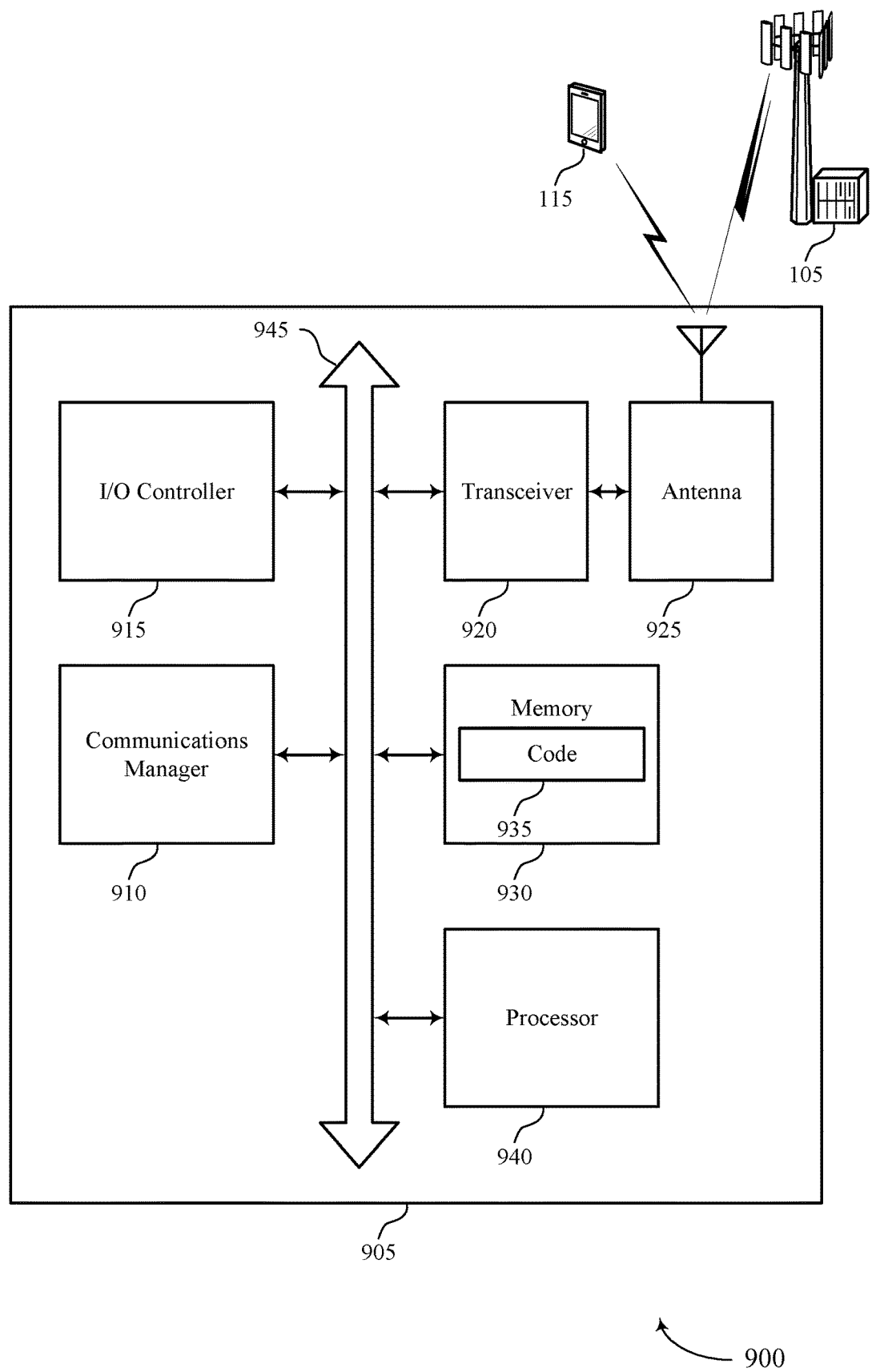
FIG. 9 shows a diagram of a system including a device that supports intra-device collision handling in accordance with aspects of the present disclosure.

FIG. 9 shows a diagram of a system 900 including a device 905 that supports intra-device collision handling in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be coupled via one or more buses (e.g., bus 945).

The communications manager 910 may identify a first set of resources scheduled for downlink communications on a first downlink shared channel for the UE, identify a second set of resources scheduled for downlink communications on a second downlink shared channel for the UE, where the second set of resources at least partially overlaps the first set of resources, identify a set of rate-matching resources configured for the second downlink shared channel, and obtain a downlink message on the second downlink shared channel by de-rate matching around the set of rate-matching resources independent of any rate-matching resources configured for the first downlink shared channel.

In some examples, the communications manager 910 may identify a first priority associated with the first downlink shared channel and a second priority associated with the second downlink shared channel. In some examples, the second priority may be higher than the first priority.

The communications manager 910 may also identify a set of CBs of a downlink shared channel for the UE, the downlink shared channel associated with a first priority, identify that a portion of the set of CBs is preempted by a transmission of a second priority higher than the first priority, assign an ACK bit to each CB that is at least partially preempted by the transmission, determine either an ACK bit or a NAK bit for each of the set of CBs that are not at least partially preempted, determine one or more feedback messages based on the ACK bits or the NAK bits assigned to or determined for each of the set of CBs, and transmit the one or more feedback messages to report feedback for the set of CBs.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or the device 905 may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting intra-device collision handling).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
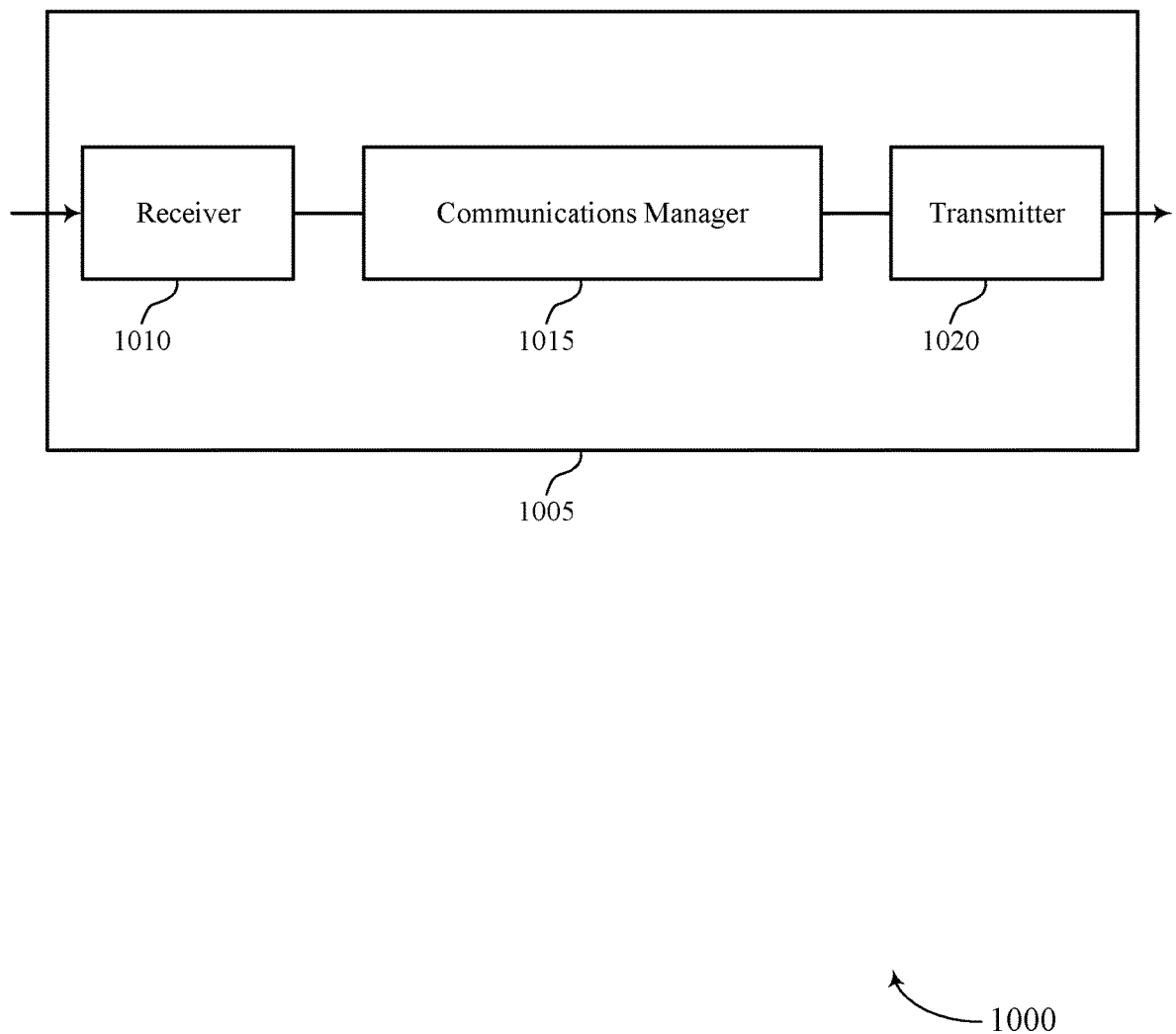
FIGS. 10 and 11 show block diagrams of devices that support intra-device collision handling in accordance with aspects of the present disclosure.

FIG. 10 shows a block diagram 1000 of a device 1005 that supports intra-device collision handling in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to intra-device collision handling, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of CBs of a downlink shared channel for a UE, identify that a portion of the set of CBs is at least partially preempted by a transmission. In some examples, the first downlink shared channel may be associated with a first priority and the transmission may be associated with a second priority. In some cases, the second priority may be greater than the first priority. The communications manager 1015 may receive one or more feedback messages from the UE reporting feedback for the set of CBs, where at least one of the one or more feedback messages corresponds to the portion of the set of CBs that is at least partially preempted by the transmission, and retransmit the portion of the set of CBs that were at least partially preempted, regardless of whether the at least one of the one or more feedback messages indicates an ACK or a NAK. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
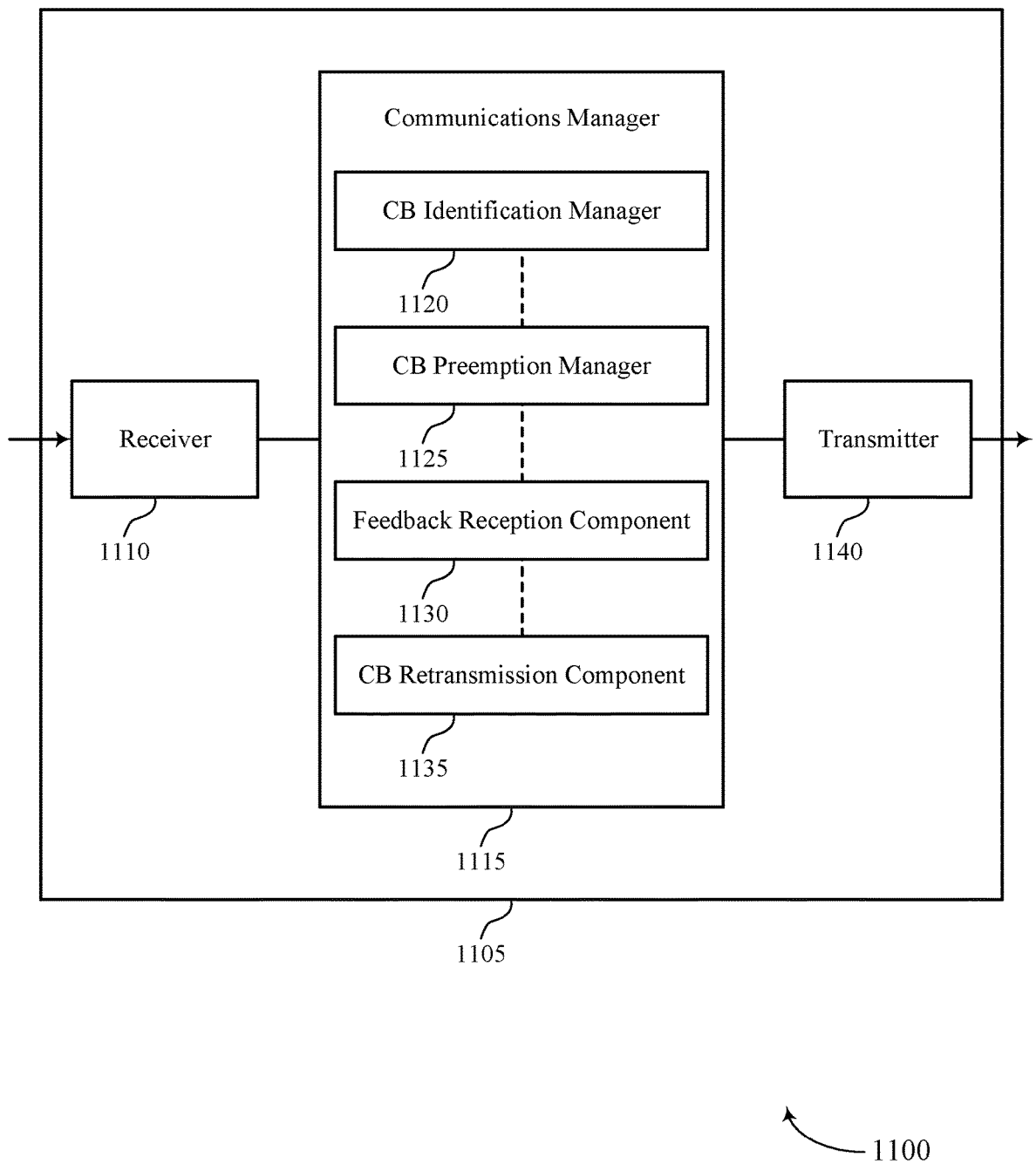

FIG. 11 shows a block diagram 1100 of a device 1105 that supports intra-device collision handling in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to intra-device collision handling, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CB identification manager 1120, a CB preemption manager 1125, a feedback reception component 1130, and a CB retransmission component 1135. The communications manager 1115 may be an example of aspects of the communications manager 1310 described herein.

The CB identification manager 1120 may identify a set of CBs of a downlink shared channel for a UE.

The CB preemption manager 1125 may identify that a portion of the set of CBs is at least partially preempted by a transmission.

In some examples, CB preemption manager 1125 may identify a first priority associated with the downlink shared channel and a second priority associated with the transmission. In some examples, the second priority may be higher than the first priority.

The feedback reception component 1130 may receive one or more feedback messages from the UE reporting feedback for the set of CBs, where at least one of the one or more feedback messages corresponds to the portion of the set of CBs that is at least partially preempted by the transmission.

The CB retransmission component 1135 may retransmit the portion of the set of CBs that were at least partially preempted, regardless of whether the at least one of the one or more feedback messages indicates an ACK or a NAK.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
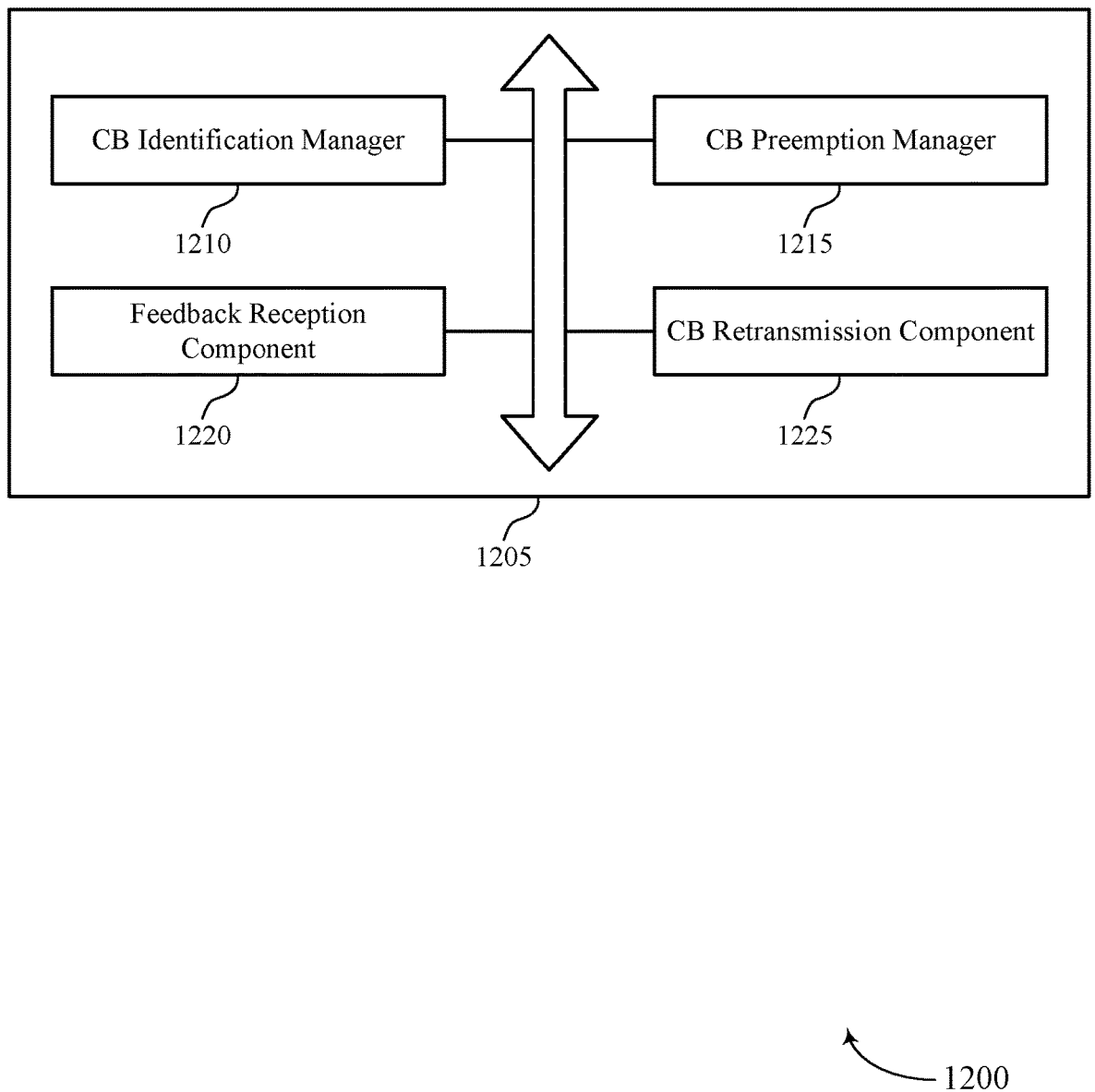
FIG. 12 shows a block diagram of a communications manager that supports intra-device collision handling in accordance with aspects of the present disclosure.

FIG. 12 shows a block diagram 1200 of a communications manager 1205 that supports intra-device collision handling in accordance with aspects of the present disclosure. The communications manager 1205 may be an example of aspects of a communications manager 1015, a communications manager 1115, or a communications manager 1310 described herein. The communications manager 1205 may include a CB identification manager 1210, a CB preemption manager 1215, a feedback reception component 1220, and a CB retransmission component 1225. Each of these modules may communicate, directly or indirectly, with one another (e.g., via one or more buses).

The CB identification manager 1210 may identify a set of CBs of a downlink shared channel for a UE.

The CB preemption manager 1215 may identify that a portion of the set of CBs is at least partially preempted by a transmission.

In some examples, CB preemption manager 1215 may identify a first priority associated with the downlink shared channel and a second priority associated with the transmission. In some examples, the second priority may be higher than the first priority.

The feedback reception component 1220 may receive one or more feedback messages from the UE reporting feedback for the set of CBs, where at least one of the one or more feedback messages corresponds to the portion of the set of CBs that is at least partially preempted by the transmission.

In some examples, receiving respective feedback messages for each TB associated with the set of CBs, where each TB includes multiple CBs of the set of CBs.

In some examples, receiving respective feedback messages for each CBG associated with the set of CBs, where each CBG includes multiple CBs of the set of CBs.

The CB retransmission component 1225 may retransmit the portion of the set of CBs that were at least partially preempted, regardless of whether the at least one of the one or more feedback messages indicates an ACK or a NAK.

Figure 13:
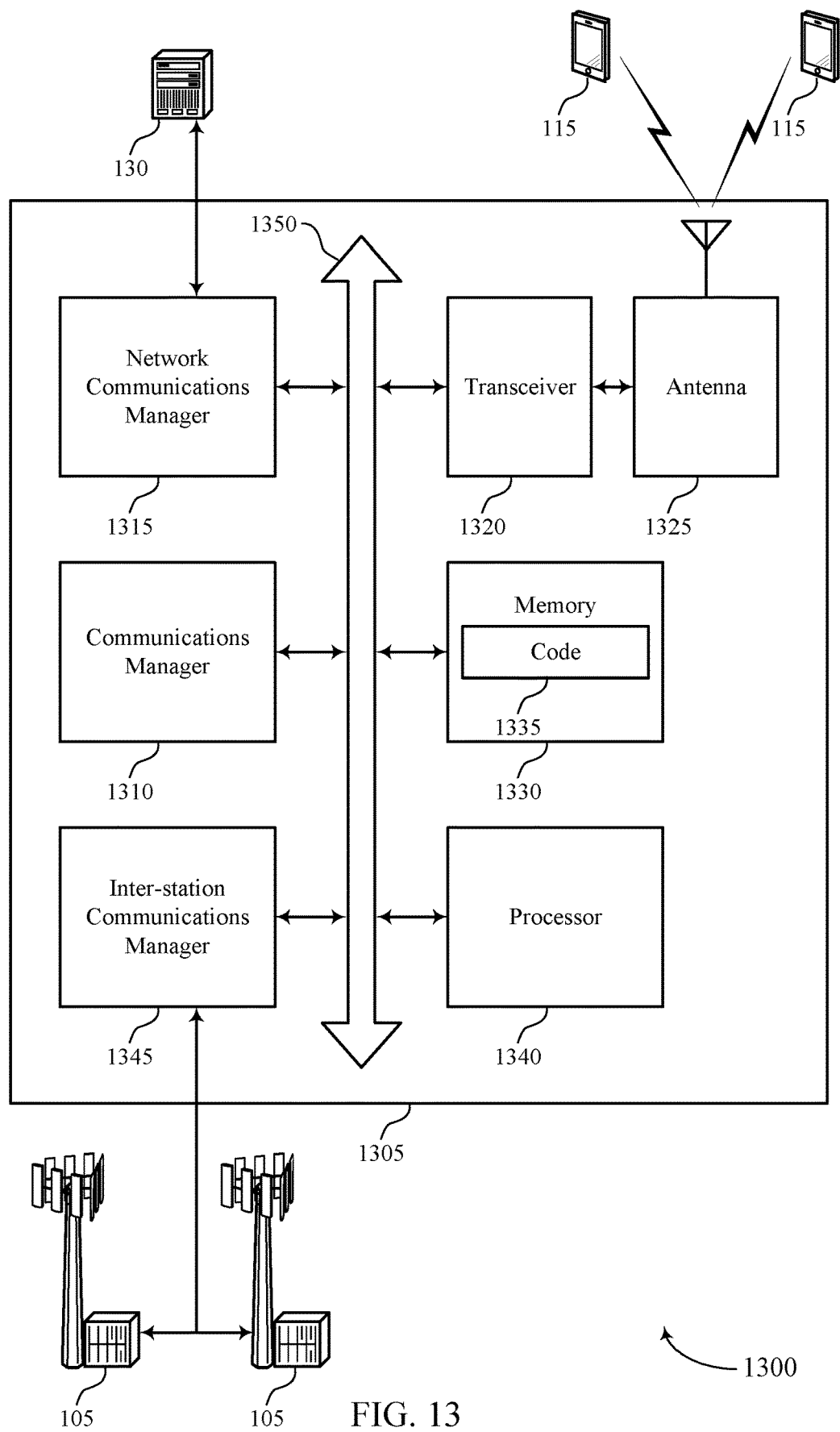
FIG. 13 shows a diagram of a system including a device that supports intra-device collision handling in accordance with aspects of the present disclosure.

FIG. 13 shows a diagram of a system 1300 including a device 1305 that supports intra-device collision handling in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be coupled via one or more buses (e.g., bus 1350).

The communications manager 1310 may identify a set of CBs of a downlink shared channel for a UE, identify that a portion of the set of CBs is at least partially preempted by a transmission, In some examples, communications manager 1310 may identify a first priority associated with the downlink shared channel and a second priority associated with the transmission. In some examples, the second priority may be higher than the first priority. The communications 1310 receive one or more feedback messages from the UE reporting feedback for the set of CBs, where at least one of the one or more feedback messages corresponds to the portion of the set of CBs that is at least partially preempted by the transmission, and retransmit the portion of the set of CBs that were at least partially preempted, regardless of whether the at least one of the one or more feedback messages indicates an ACK or a NAK.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting intra-device collision handling).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
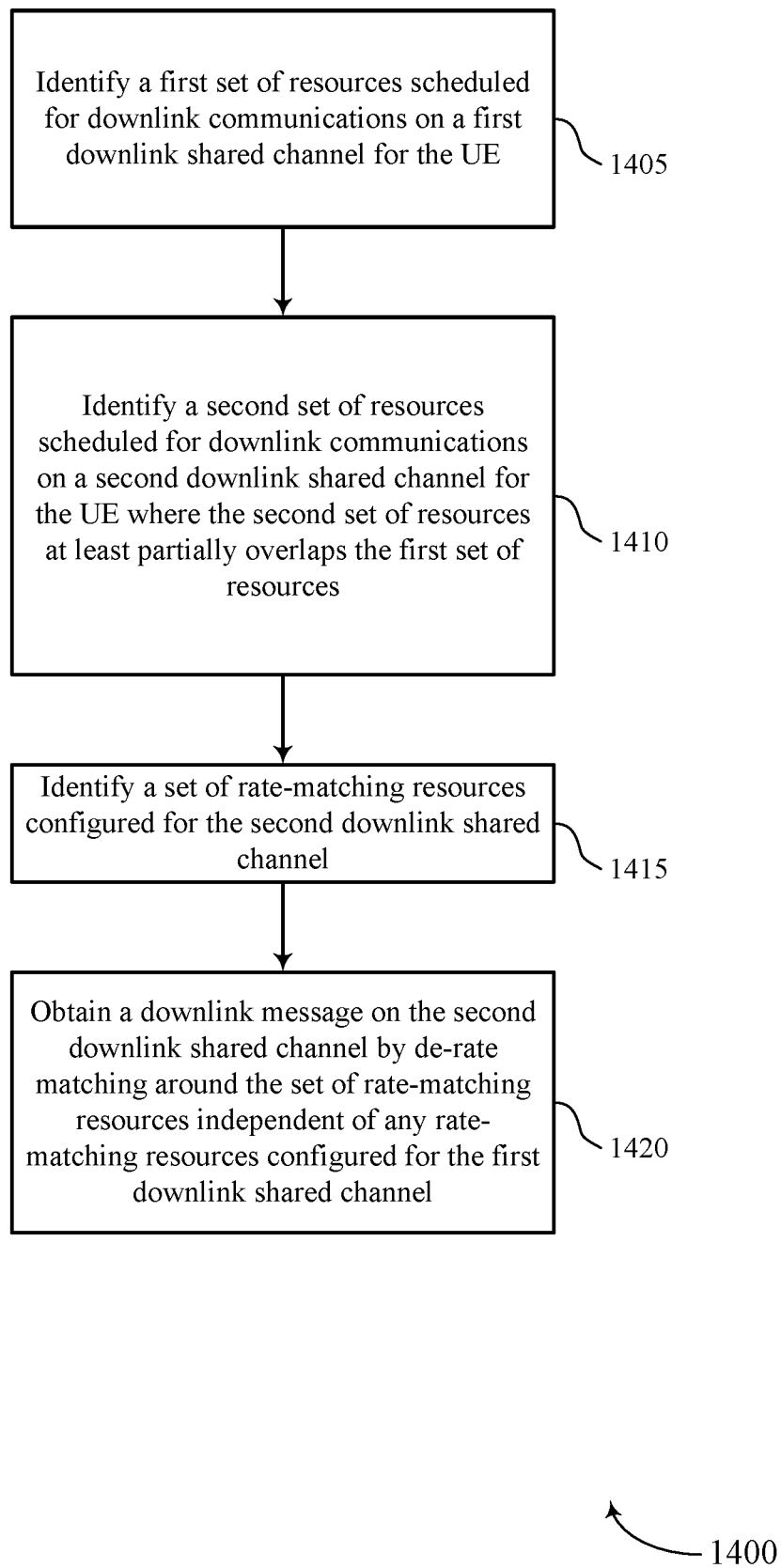
FIGS. 14 through 18 show flowcharts illustrating methods that support intra-device collision handling in accordance with aspects of the present disclosure.

FIG. 14 shows a flowchart illustrating a method 1400 that supports intra-device collision handling in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a first set of resources scheduled for downlink communications on a first downlink shared channel for the UE. The operations of 1405 may be performed according to the methods described herein. In some examples, aspects of the operations of 1405 may be performed by a first downlink channel identification component as described with reference to FIGS. 6 through 9.

At 1410, the UE may identify a second set of resources scheduled for downlink communications on a second downlink shared channel for the UE, where the second set of resources at least partially overlaps the first set of resources. The operations of 1410 may be performed according to the methods described herein. In some examples, aspects of the operations of 1410 may be performed by a second downlink channel identification component as described with reference to FIGS. 6 through 9.

In some examples at 1410 or 1405, the UE may identify a first priority associated with the first downlink shared channel and a second priority associated with the second downlink shared channel. In some examples, the second priority may be higher than the first priority.

At 1415, the UE may identify a set of rate-matching resources configured for the second downlink shared channel. The operations of 1415 may be performed according to the methods described herein. In some examples, aspects of the operations of 1415 may be performed by a rate-matching resource identification component as described with reference to FIGS. 6 through 9.

At 1420, the UE may obtain a downlink message on the second downlink shared channel by de-rate matching around the set of rate-matching resources independent of any rate-matching resources configured for the first downlink shared channel. The operations of 1420 may be performed according to the methods described herein. In some examples, aspects of the operations of 1420 may be performed by a downlink reception component as described with reference to FIGS. 6 through 9.

Figure 15:
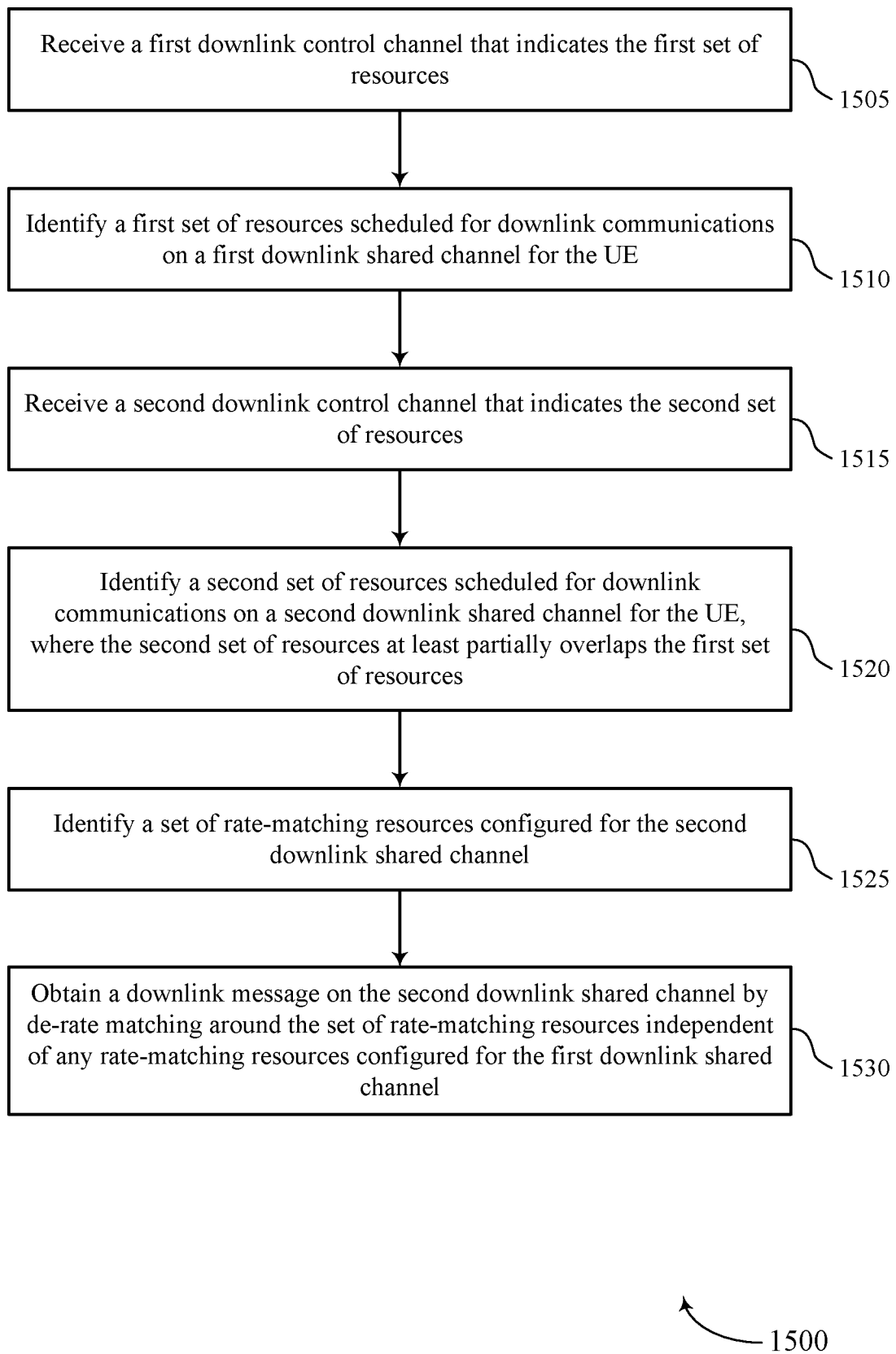

FIG. 15 shows a flowchart illustrating a method 1500 that supports intra-device collision handling in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive a first downlink control channel that indicates the first set of resources. The operations of 1505 may be performed according to the methods described herein. In some examples, aspects of the operations of 1505 may be performed by a downlink control component as described with reference to FIGS. 6 through 9.

At 1510, the UE may identify a first set of resources scheduled for downlink communications on a first downlink shared channel for the UE. The operations of 1510 may be performed according to the methods described herein. In some examples, aspects of the operations of 1510 may be performed by a first downlink channel identification component as described with reference to FIGS. 6 through 9.

At 1515, the UE may receive a second downlink control channel that indicates the second set of resources. The operations of 1515 may be performed according to the methods described herein. In some examples, aspects of the operations of 1515 may be performed by a downlink control component as described with reference to FIGS. 6 through 9.

At 1520, the UE may identify a second set of resources scheduled for downlink communications on a second downlink shared channel for the UE, where the second set of resources at least partially overlaps the first set of resources. The operations of 1520 may be performed according to the methods described herein. In some examples, aspects of the operations of 1520 may be performed by a second downlink channel identification component as described with reference to FIGS. 6 through 9.

In some examples at 1510-1520, the UE may identify a first priority associated with the first downlink shared channel and a second priority associated with the second downlink shared channel. In some examples, the second priority may be higher than the first priority.

At 1525, the UE may identify a set of rate-matching resources configured for the second downlink shared channel. The operations of 1525 may be performed according to the methods described herein. In some examples, aspects of the operations of 1525 may be performed by a rate-matching resource identification component as described with reference to FIGS. 6 through 9.

At 1530, the UE may obtain a downlink message on the second downlink shared channel by de-rate matching around the set of rate-matching resources independent of any rate-matching resources configured for the first downlink shared channel. The operations of 1530 may be performed according to the methods described herein. In some examples, aspects of the operations of 1530 may be performed by a downlink reception component as described with reference to FIGS. 6 through 9.

Figure 16:
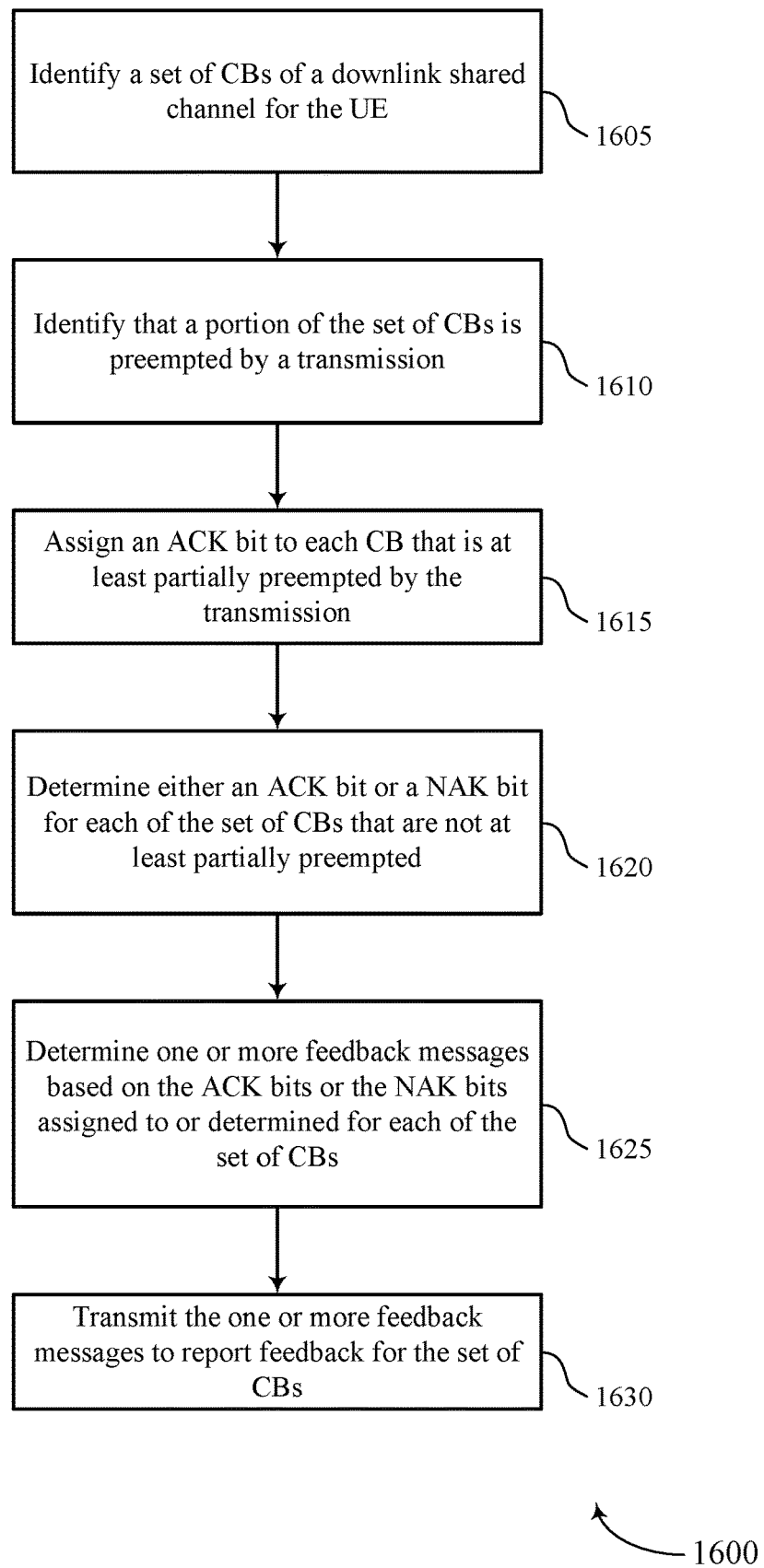

FIG. 16 shows a flowchart illustrating a method 1600 that supports intra-device collision handling in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify a set of CBs of a downlink shared channel for the UE. The operations of 1605 may be performed according to the methods described herein. In some examples, aspects of the operations of 1605 may be performed by a CB identification component as described with reference to FIGS. 6 through 9.

At 1610, the UE may identify that a portion of the set of CBs is preempted by a transmission. The operations of 1610 may be performed according to the methods described herein. In some examples, aspects of the operations of 1610 may be performed by a CB preemption component as described with reference to FIGS. 6 through 9.

In some examples at 1605 or 1610, the UE may identify a first priority associated with the first downlink shared channel and a second priority associated with the transmission. In some examples, the second priority may be higher than the first priority.

At 1615, the UE may assign an ACK bit to each CB that is at least partially preempted by the transmission. The operations of 1615 may be performed according to the methods described herein. In some examples, aspects of the operations of 1615 may be performed by an ACK assignment component as described with reference to FIGS. 6 through 9.

At 1620, the UE may determine either an ACK bit or a NAK bit for each of the set of CBs that are not at least partially preempted. The operations of 1620 may be performed according to the methods described herein. In some examples, aspects of the operations of 1620 may be performed by an ACK/NAK component as described with reference to FIGS. 6 through 9.

At 1625, the UE may determine one or more feedback messages based on the ACK bits or the NAK bits assigned to or determined for each of the set of CBs. The operations of 1625 may be performed according to the methods described herein. In some examples, aspects of the operations of 1625 may be performed by a feedback message component as described with reference to FIGS. 6 through 9.

At 1630, the UE may transmit the one or more feedback messages to report feedback for the set of CBs. The operations of 1630 may be performed according to the methods described herein. In some examples, aspects of the operations of 1630 may be performed by a feedback transmission component as described with reference to FIGS. 6 through 9.

Figure 17:
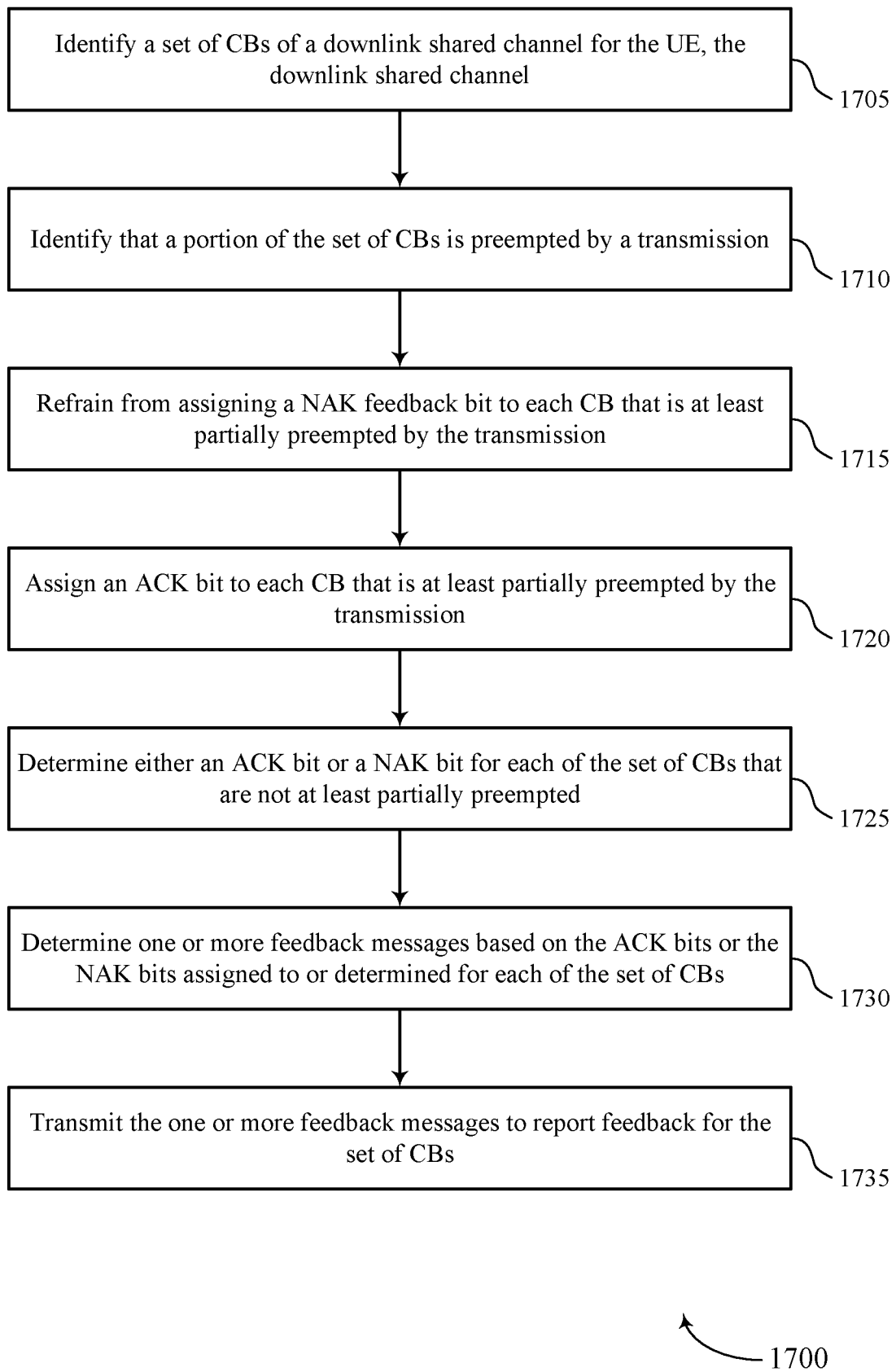

FIG. 17 shows a flowchart illustrating a method 1700 that supports intra-device collision handling in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may identify a set of CBs of a downlink shared channel for the UE. The operations of 1705 may be performed according to the methods described herein. In some examples, aspects of the operations of 1705 may be performed by a CB identification component as described with reference to FIGS. 6 through 9.

At 1710, the UE may identify that a portion of the set of CBs is preempted by a transmission. The operations of 1710 may be performed according to the methods described herein. In some examples, aspects of the operations of 1710 may be performed by a CB preemption component as described with reference to FIGS. 6 through 9.

In some examples at 1705 or 1710, the UE may identify a first priority associated with the first downlink shared channel and a second priority associated with the transmission. In some examples, the second priority may be higher than the first priority.

At 1715, the UE may refrain from assigning a NAK feedback bit to each CB that is at least partially preempted by the transmission. The operations of 1715 may be performed according to the methods described herein. In some examples, aspects of the operations of 1715 may be performed by an ACK assignment component as described with reference to FIGS. 6 through 9.

At 1720, the UE may assign an ACK bit to each CB that is at least partially preempted by the transmission. The operations of 1720 may be performed according to the methods described herein. In some examples, aspects of the operations of 1720 may be performed by an ACK assignment component as described with reference to FIGS. 6 through 9.

At 1725, the UE may determine either an ACK bit or a NAK bit for each of the set of CBs that are not at least partially preempted. The operations of 1725 may be performed according to the methods described herein. In some examples, aspects of the operations of 1725 may be performed by an ACK/NAK component as described with reference to FIGS. 6 through 9.

At 1730, the UE may determine one or more feedback messages based on the ACK bits or the NAK bits assigned to or determined for each of the set of CBs. The operations of 1730 may be performed according to the methods described herein. In some examples, aspects of the operations of 1730 may be performed by a feedback message component as described with reference to FIGS. 6 through 9.

At 1735, the UE may transmit the one or more feedback messages to report feedback for the set of CBs. The operations of 1735 may be performed according to the methods described herein. In some examples, aspects of the operations of 1735 may be performed by a feedback transmission component as described with reference to FIGS. 6 through 9.

Figure 18:
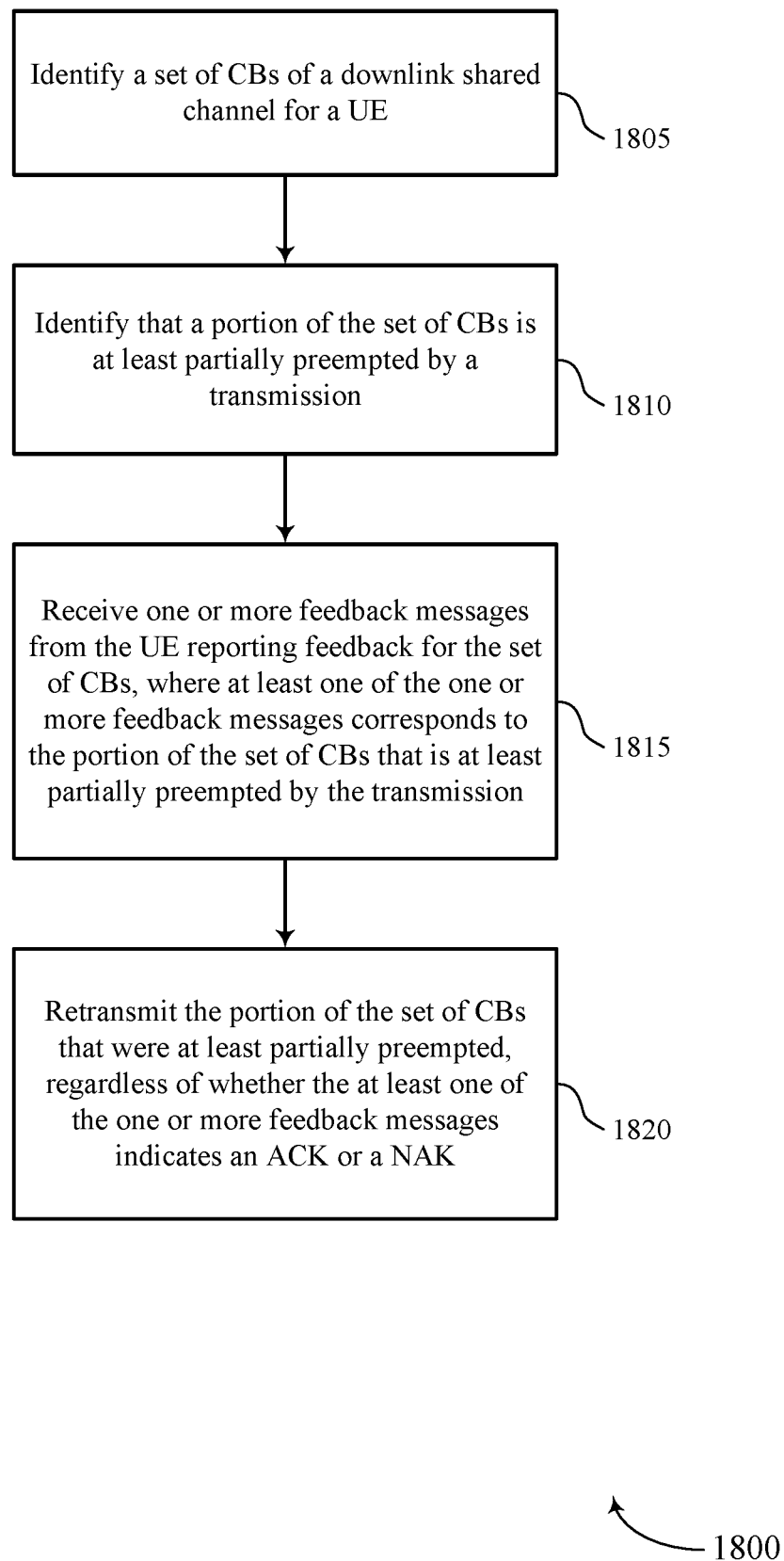

FIG. 18 shows a flowchart illustrating a method 1800 that supports intra-device collision handling in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may identify a set of CBs of a downlink shared channel for a UE. The operations of 1805 may be performed according to the methods described herein. In some examples, aspects of the operations of 1805 may be performed by a CB identification manager as described with reference to FIGS. 10 through 13.

At 1810, the base station may identify that a portion of the set of CBs is at least partially preempted by a transmission. The operations of 1810 may be performed according to the methods described herein. In some examples, aspects of the operations of 1810 may be performed by a CB preemption manager as described with reference to FIGS. 10 through 13.

In some examples at 1805 or 1810, the base station may identify a first priority associated with the first downlink shared channel and a second priority associated with the transmission. In some examples, the second priority may be higher than the first priority.

At 1815, the base station may receive one or more feedback messages from the UE reporting feedback for the set of CBs, where at least one of the one or more feedback messages corresponds to the portion of the set of CBs that is at least partially preempted by the transmission. The operations of 1815 may be performed according to the methods described herein. In some examples, aspects of the operations of 1815 may be performed by a feedback reception component as described with reference to FIGS. 10 through 13.

At 1820, the base station may retransmit the portion of the set of CBs that were at least partially preempted, regardless of whether the at least one of the one or more feedback messages indicates an ACK or a NAK. The operations of 1820 may be performed according to the methods described herein. In some examples, aspects of the operations of 1820 may be performed by a CB retransmission component as described with reference to FIGS. 10 through 13.

Example 1

A method for wireless communications at a user equipment (UE), comprising: identifying a first set of resources scheduled for downlink communications on a first downlink shared channel for the UE, identifying a second set of resources scheduled for downlink communications on a second downlink shared channel for the UE, wherein the second set of resources at least partially overlaps the first set of resources, identifying a set of rate-matching resources configured for the second downlink shared channel, and obtaining a downlink message on the second downlink shared channel by de-rate matching around the set of rate-matching resources independent of any rate-matching resources configured for the first downlink shared channel.

Example 2

The method of example 1, further comprising: identifying a first priority associated with the first downlink shared channel and a second priority associated with the second downlink shared channel, wherein the second priority is higher than the first priority.

Example 3

The method of any of examples 1 or 2, wherein the rate-matching resources configured for the first downlink shared channel at least partially overlap the set of rate-matching resources configured for the second downlink shared channel.

Example 4

The method of any of examples 1 to 3, further comprising: receiving a first downlink control channel that indicates the first set of resources, and receiving a second downlink control channel that indicates the second set of resources.

Example 5

The method of example 4, wherein the first downlink control channel comprises first downlink control information (DCI) for the first downlink shared channel, the first DCI indicating the rate-matching resources configured for the first downlink shared channel.

Example 6

The method of any of examples 4 or 5, wherein the second downlink control channel comprises second downlink control information (DCI) for the second downlink shared channel, the second DCI indicating the set of rate-matching resources configured for the second downlink shared channel.

Example 7

The method of any of examples 1 to 6, further comprising: receiving an indication of the set of rate-matching resources configured for the second downlink shared channel as a set of shared channel rate-matching resources associated with the second priority, wherein the rate-matching resources configured for the first downlink shared channel are associated with the first priority.

Example 8

The method of example 7, wherein an indication of the set of shared channel rate-matching resources is received via radio resource control (RRC) signaling.

Example 9

The method of any of examples 1 to 8, wherein the second set of resources at least partially overlaps the first set of resources in time.

Example 10

The method of any of examples 1 to 9, wherein the second set of resources at least partially overlaps the first set of resources in time and frequency.

Example 11

A method for wireless communications at a user equipment (UE), comprising: identifying a set of code blocks of a downlink shared channel for the UE, identifying that a portion of the set of code blocks is preempted by a transmission, assigning an acknowledgement bit to each code block that is at least partially preempted by the transmission, determining either an acknowledgement bit or a negative acknowledgement bit for each of the set of code blocks that are not at least partially preempted, determining one or more feedback messages based on the acknowledgement bits or the negative acknowledgement bits assigned to or determined for each of the set of code blocks, and transmitting the one or more feedback messages to report feedback for the set of code blocks.

Example 12

The method of example 11, further comprising: identifying a first priority associated with the first downlink shared channel and a second priority associated with the transmission, wherein the second priority is higher than the first priority.

Example 13

The method of any of examples 11 or 12, further comprising: refraining from assigning a negative acknowledgement (NAK) feedback bit to each code block that is at least partially preempted by the transmission.

Example 14

The method of any of examples 11 to 13, further comprising: transmitting respective feedback messages for each code block group associated with the set of code blocks, wherein each code block group comprises multiple code blocks of the set of code blocks.

Example 15

The method of any of examples 11 to 14, further comprising: transmitting respective feedback messages for each transport block associated with the set of code blocks, wherein each transport block comprises multiple code blocks of the set of code blocks.

Example 16

The method of any of examples 11 to 15, further comprising: performing a decoding process on each of the set of code blocks that are not at least partially preempted and determining feedback for each of the set of code blocks that are not at least partially preempted based at least in part on the decoding process.

Example 17

A method of wireless communications at a base station, comprising: identifying a set of code blocks of a downlink shared channel for a user equipment (UE), identifying that a portion of the set of code blocks is at least partially preempted by a transmission, receiving one or more feedback messages from the UE reporting feedback for the set of code blocks, wherein at least one of the one or more feedback messages corresponds to the portion of the set of code blocks that is at least partially preempted by the transmission, and retransmitting the portion of the set of code blocks that were at least partially preempted, regardless of whether the at least one of the one or more feedback messages indicates an acknowledgement or a negative acknowledgement.

Example 18

The method of example 17, further comprising: identifying a first priority associated with the first downlink shared channel and a second priority associated with the transmission, wherein the second priority is higher than the first priority.

Example 19

The method of any of examples 17 or 18 further comprising: receiving respective feedback messages for each transport block associated with the set of code blocks, wherein each transport block comprises multiple code blocks of the set of code blocks.

Example 20

The method of any of examples 17 to 19, further comprising: receiving respective feedback messages for each code block group associated with the set of code blocks, wherein each code block group comprises multiple code blocks of the set of code blocks.

Example 21

An apparatus comprising at least one mans for performing a method of any of examples 1 to 20.

Example 22

An apparatus for wireless communications comprising a processor; memory coupled with the processor, and instructions stored in the memory and executable by the processor to cause the apparatus to perform a method of any of the examples 1 to 20.

Example 23

A non-transitory computer-readable medium storing code for wireless communications, the code comprising instructions executable by a processor to perform a method of any of the examples 1 to 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a first downlink message indicating a first set of resources scheduled for downlink communications on a first downlink shared channel for the UE;
   receiving a second downlink message indicating a second set of resources scheduled for downlink communications on a second downlink shared channel for the UE and indicating a set of rate-matching resources configured for the second downlink shared channel; and
   receiving a third downlink message on the second downlink shared channel by rate matching around the set of rate-matching resources independent of any rate-matching resources configured for the first downlink shared channel.

2. The method of claim 1, wherein rate matching around the set of rate-matching resources comprises:
   rate matching around the set of rate-matching resources based at least in part on a first priority associated with the first downlink shared channel and a second priority associated with the second downlink shared channel, wherein the second priority is higher than the first priority.

3. The method of claim 1, wherein the set of rate-matching resources configured for the first downlink shared channel at least partially overlap the set of rate-matching resources configured for the second downlink shared channel.

4. The method of claim 1, wherein receiving the first downlink message and the second downlink message comprises:
   receiving a first downlink control channel that indicates the first set of resources; and receiving a second downlink control channel that indicates the second set of resources.

5. The method of claim 4, wherein the first downlink control channel comprises a first downlink control information (DCI) for the first downlink shared channel, the first DCI indicating the set of rate-matching resources configured for the first downlink shared channel.

6. The method of claim 4, wherein the second downlink control channel comprises a second downlink control information (DCI) for the second downlink shared channel, the second DCI indicating the set of rate-matching resources configured for the second downlink shared channel.

7. The method of claim 1, wherein receiving the first downlink message and the second downlink message comprises:
receiving an indication of the set of rate-matching resources configured for the second downlink shared channel as a set of shared channel rate-matching resources associated with a second priority, wherein the set of rate-matching resources configured for the first downlink shared channel are associated with a first priority.

8. The method of claim 7, wherein receiving the first downlink message and the second downlink message comprises:
receiving an indication of the set of shared channel rate-matching resources via radio resource control (RRC) signaling.

9. The method of claim 1, wherein the second set of resources at least partially overlaps the first set of resources in time.

10. The method of claim 1, wherein the second set of resources at least partially overlaps the first set of resources in time and frequency.

11. An apparatus for wireless communications at a user equipment (UE), comprising:
a processor;
memory coupled with the processor; and
instructions stored in the memory and executable by the processor to cause the apparatus to:
receive a first downlink message indicating a first set of resources scheduled for downlink communications on a first downlink shared channel for the UE;
receive a second downlink message indicating a second set of resources scheduled for downlink communications on a second downlink shared channel for the UE
and indicating a set of rate-matching resources configured for the second downlink shared channel; and
receive a third downlink message on the second downlink shared channel by rate matching around the set of rate-matching resources independent of any rate-matching resources configured for the first downlink shared channel.

12. The apparatus of claim 11, wherein the instructions executable by the processor to cause the apparatus to rate match around the set of rate-matching resources are further executable by the processor to cause the apparatus to:
rate match around the set of rate-matching resources based at least in part on a first priority associated with the first downlink shared channel and a second priority associated with the second downlink shared channel, wherein the second priority is higher than the first priority.

13. The apparatus of claim 11, wherein the set of rate-matching resources configured for the first downlink shared channel at least partially overlap the set of rate-matching resources configured for the second downlink shared channel.

14. The apparatus of claim 11, wherein the instructions executable by the processor to cause the apparatus to receive the first downlink message and the second downlink message are further executable by the processor to cause the apparatus to:
receive a first downlink control channel that indicates the first set of resources; and
receive a second downlink control channel that indicates the second set of resources.

15. The apparatus of claim 14, wherein the first downlink control channel comprises a first downlink control information (DCI) for the first downlink shared channel, the first DCI indicating the set of rate-matching resources configured for the first downlink shared channel.

16. The apparatus of claim 14, wherein the second downlink control channel comprises a second downlink control information (DCI) for the second downlink shared channel, the second DCI indicating the set of rate-matching resources configured for the second downlink shared channel.

17. The apparatus of claim 11, wherein the instructions executable by the processor to cause the apparatus to receive the first downlink message and the second downlink message are further executable by the processor to cause the apparatus to:
receive an indication of the set of rate-matching resources configured for the second downlink shared channel as a set of shared channel rate-matching resources associated with a second priority, wherein the set of rate-matching resources configured for the first downlink shared channel are associated with a first priority.

18. The apparatus of claim 17, wherein the instructions executable by the processor to cause the apparatus to receive the first downlink message and the second downlink message are further executable by the processor to cause the apparatus to:
receive an indication of the set of shared channel rate-matching resources via radio resource control (RRC) signaling.

19. The apparatus of claim 11, wherein the second set of resources at least partially overlaps the first set of resources in time.

20. The apparatus of claim 11, wherein the second set of resources at least partially overlaps the first set of resources in time and frequency.

21. An apparatus for wireless communications at a user equipment (UE), comprising:
means for receiving a first downlink message indicating a first set of resources scheduled for downlink communications on a first downlink shared channel for the UE;
means for receiving a second downlink message indicating a second set of resources scheduled for downlink communications on a second downlink shared channel for the UE
and indicating a set of rate-matching resources configured for the second downlink shared channel; and
means for receiving a third downlink message on the second downlink shared channel by rate matching around the set of rate-matching resources independent of any rate-matching resources configured for the first downlink shared channel.

22. The apparatus of claim 21, wherein the means for rate matching around the set of rate-matching resources comprises:

means for rate matching around the set of rate-matching resources based at least in part on a first priority associated with the first downlink shared channel and a second priority associated with the second downlink shared channel, wherein the second priority is higher than the first priority.

23. The apparatus of claim 21, wherein the set of rate-matching resources configured for the first downlink shared channel at least partially overlap the set of rate-matching resources configured for the second downlink shared channel.

24. The apparatus of claim 21, wherein the means for receiving the first downlink message and the second downlink message comprises:
   means for receiving a first downlink control channel that indicates the first set of resources; and
   means for receiving a second downlink control channel that indicates the second set of resources.

25. The apparatus of claim 24, wherein the first downlink control channel comprises a first downlink control information (DCI) for the first downlink shared channel, the first DCI indicating the set of rate-matching resources configured for the first downlink shared channel.

26. The apparatus of claim 24, wherein the second downlink control channel comprises a second downlink control information (DCI) for the second downlink shared channel, the second DCI indicating the set of rate-matching resources configured for the second downlink shared channel.

27. The apparatus of claim 21, wherein the means for receiving the first downlink message and the second downlink message comprises:
   means for receiving an indication of the set of rate-matching resources configured for the second downlink shared channel as a set of shared channel rate-matching resources associated with a second priority, wherein the set of rate-matching resources configured for the first downlink shared channel are associated with a first priority.

28. The apparatus of claim 27, wherein the means for receiving the first downlink message and the second downlink message comprises:
   means for receiving an indication of the set of shared channel rate-matching resources via radio resource control (RRC) signaling.

29. The apparatus of claim 21, wherein the second set of resources at least partially overlaps the first set of resources in time, frequency, or both.

30. A non-transitory computer-readable medium storing code for wireless communications at a user equipment (UE), the code comprising instructions executable by a processor to:
   receive a first downlink message indicating a first set of resources scheduled for downlink communications on a first downlink shared channel for the UE;
   receive a second downlink message indicating a second set of resources scheduled for downlink communications on a second downlink shared channel for the UE and indicating a set of rate-matching resources configured for the second downlink shared channel; and
   receive a third downlink message on the second downlink shared channel by rate matching around the set of rate-matching resources independent of any rate-matching resources configured for the first downlink shared channel.

* * * * *